(12) United States Patent
Sato et al.

(10) Patent No.: US 7,257,098 B2
(45) Date of Patent: Aug. 14, 2007

(54) WIRELESS COMMUNICATIONS EQUIPMENT

(75) Inventors: Hiroyo Sato, Tokyo (JP); Hiroyuki Murakami, Eniwa (JP); Kenya Uedo, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 1086 days.

(21) Appl. No.: 10/189,401

(22) Filed: Jul. 8, 2002

(65) Prior Publication Data

US 2003/0021257 A1   Jan. 30, 2003

(30) Foreign Application Priority Data

Jul. 10, 2001 (JP) .............................. 2001-208987
Mar. 27, 2002 (JP) .............................. 2002-087370
May 23, 2002 (JP) .............................. 2002-148533

(51) Int. Cl.
*H04Q 7/00* (2006.01)
*H04J 3/26* (2006.01)
*H04J 3/16* (2006.01)

(52) U.S. Cl. ...................... 370/329; 370/432; 370/468

(58) Field of Classification Search .................. None
See application file for complete search history.

(56) References Cited

U.S. PATENT DOCUMENTS 5,742,594 A * 4/1998 Natarajan .................. 370/336
6,799,043 B2 * 9/2004 Tiedemann et al. ......... 455/450
6,891,810 B2 * 5/2005 Struhsaker et al. ......... 370/294
6,980,533 B1 * 12/2005 Abraham et al. ........... 370/329
6,982,969 B1 * 1/2006 Carneal et al. ............. 370/329
7,164,669 B2 * 1/2007 Li et al. ..................... 370/336
2002/0119782 A1 * 8/2002 Voyer ......................... 455/450
2005/0243745 A1 * 11/2005 Stanwood et al. .......... 370/280

* cited by examiner

*Primary Examiner*—Kwang Bin Yao
*Assistant Examiner*—Warner Wong
(74) *Attorney, Agent, or Firm*—Wenderoth, Lind & Ponack, L.L.P.

(57) ABSTRACT

In a wireless communications system, a base station unit covers a plurality of communications station units and downlink and uplink communication between the base station unit and the communications station unit are wireless. Each of the communications station units covered by the base station unit is assigned to one of a plurality of groups that perform receiving or sending in the same time band. Each group's communication time band is made different for downlink and uplink communication. The downlink communication and uplink communication between the base station unit and plurality of communications station units is performed in time-division multiplexing regarding each of the plurality of groups to achieve a good assignment of groups. At the time of group assignment, the total amount of sending and receiving are adjusted for each group based on the traffic situation in order to reduce the empty time in downlink communication and uplink communication.

13 Claims, 11 Drawing Sheets ial application. In addition, with the popularity of the Internet, the need for high-speed, large-capacity communication over wireless media has heightened.
WIRELESS COMMUNICATIONS EQUIPMENT

BACKGROUND OF THE INVENTION

1. Field of the Invention

This invention relates to a wireless communications system or the like that performs wireless communication between base station equipment and a plurality of communications station units, and particularly to technology that achieves a good assignment of groups in a composition wherein each of the communications station units is assigned to a group that defines the receive time band and send time band, and the receive time band and send time band of each communications station unit are made to be different, thereby achieving a good allocation of groups.

In addition, this invention relates to a wireless communications system or the like that performs wireless communication between base station equipment and a plurality of communications station units, and particularly to technology that achieves a good assignment of groups in a composition wherein each of the communications station units is assigned to a group that defines the receive time band and send time band, and the receive time band and send time band of each communications station unit are made to be different, thereby improving the efficiency of data communication.

2. Description of the Prior Art

In recent years, subscriber wireless access systems that utilize wireless communication called Wireless Local Loop (WLL) or Fixed Wireless Access (FWA) or the like have been developed and put into practical application. In addition, with the popularity of the Internet, the need for high-speed, large-capacity communication over wireless media has heightened.

In the aforementioned subscriber wireless access systems, base station equipment (BSE) connected to a public circuit network or other backbone network is installed in a fixed location on the top of a building or tower or other high place, while customer premises equipment (CPE) is also installed in a fixed location on the roof of the customer's building or other high place. The customer premises equipment also includes personal computers (PCs) or other communications terminal units and such communications terminal units connected via a local area network (LAN).

Here, the base station equipment and customer premises equipment may each consist of an outdoor unit (ODU) installed in a fixed location on a building roof, tower or other high place and an indoor unit (IDU) installed in a fixed location within a building or the like, and these are connected with a cable. In addition, the outdoor unit of the base station equipment and customer premises equipment is equipped with a wireless processor that performs the processing of wireless communication using an antenna, mainly controlling the processing of wireless communication. In addition, the indoor unit of the base station equipment mainly controls data communication with the backbone network, while the indoor unit of the customer premises equipment mainly controls data communication with the communications terminal units or LAN or the like.

In addition, in the aforementioned subscriber wireless access systems, wireless communication is performed between the base station equipment and customer premises equipment by means of a time-division multiplexing communications protocol using wireless frames. It is thus possible to connect to and perform data communication among the LANs or the like connected to different customer premises equipment covered by the same base station equipment, and also connect to and perform data communication with LANs or the like connected to other customer premises equipment connected to the backbone network connected to the base station equipment.

Here follows a description of an example of the composition of a typical communication frame used in P-MP (Point-Multi Point) wireless communication conducted between base station equipment and customer premises equipment at a plurality of locations in the aforementioned subscriber wireless access systems.

First, in reference to FIGS. 10(*a*) to 10(*f*), we shall present an example of the composition of such communication frames.

Note the figure shows an example of the communications protocol in the case of performing wireless communication covering base station equipment at one location (the "base station") and customer premises equipment at two locations ("customer premises 1" and "customer premises 2").

FIG. 10(*a*) shows an example of the composition of the downlink frames in downlink communication from the base station equipment to the customer premises equipment. These downlink frames consist of the unit frames, the "first frame," "second frame," "third frame" . . . , each of which consisting of one broadcast control channel (BCCH), two downlink-only short data channels (SD1, SD2) and one downlink-only long data channel (LD1).

Here, the BCCH is a downlink traffic channel for achieving synchronization between the base station equipment and customer premises equipment, and for giving permission for data communication from the base station equipment to the customer premises equipment. The SD (SD1 and SD2) is a downlink traffic channel for sending short data from the base station equipment to the customer premises equipment. The LD (LD1) is a downlink traffic channel for sending long data from the base station equipment to the customer premises equipment.

In addition, FIG. 10(*b*) shows an example of the composition of the uplink frames in uplink communication from the customer premises equipment to the base station equipment. These uplink frames consist of the unit frames, the "first frame," "second frame," "third frame" . . . , each of which consisting of one link control channel (LCCH), two uplink-only short data channels (SU1, SU2) and one uplink-only long data channel (LU1).

Here, the LCCH is an uplink traffic channel for making a request for data communication from the customer premises equipment to the base station equipment. The SU (SU1 and SU2) is an uplink traffic channel for sending short data from the customer premises equipment to the base station equipment. The LU (LU1) is an uplink traffic channel for sending long data from the customer premises equipment to the base station equipment.

In addition, as shown in FIGS. 10(*a*) and (*b*), the downlink frames shown in FIG. 10(*a*) and the uplink frames shown in FIG. 10(*b*) are configured such that the two unit frames for each of the unit frames called the "first frame," "second frame," "third frame," . . . are disposed in the same time band. In each unit frame, BCCH and LCCH are disposed in the same time band, while SD1 and SU1 are disposed in the same time band, and LD1 and LU1 are also disposed in the same time band.

Moreover, when such communication frames are used, because of the composition of communication frames, sending and receiving are performed simultaneously in the base station equipment, and sending and receiving are also performed simultaneously in the customer premises equipment.

Specifically, as shown in FIGS. 10(a) and (b), the base station equipment uses the BCCH to send synchronization information and the like to the customer premises equipment in each unit frame. SD1, SD2 and LD1 are used to send data to the customer premises equipment. The LCCH is used to receive send requests from the customer premises equipment while SU1, SU2 and LU1 are used to receive data from the customer premises equipment.

On the other hand, as shown in FIGS. 10(c), (d), (e) and (f), the customer premises equipment uses the BCCH to receive synchronization information and the like from the base station equipment in each unit frame. SD1, SD2 and LD1 are used to receive data from the base station equipment. The LCCH is used to send send requests to the base station equipment while SU1, SU2 and LU1 are used to send data to the base station equipment. Note that SU1, SU2 and LU1 are used by the customer premises equipment permitted by the base station equipment to send data, and in the customer premises equipment in question, these data channels are used to perform the sending of data to the base station equipment.

In addition, in reference to FIG. 11, we shall present another example of the composition of typical communication frames used in P-MP wireless communication performed between base station equipment and customer premises equipment at a plurality of locations in the aforementioned subscriber wireless access systems.

Note the figure shows an example of the communications protocol in the case of performing wireless communication covering base station equipment at one location (the "base station") and customer premises equipment at two locations ("customer premises 1" and "customer premises 2").

FIG. 11(a) shows an example of the composition of the downlink frames in downlink communication from the base station equipment to the customer premises equipment. These downlink frames consist of a plurality of the unit frames, the "first frame," "second frame," "third frame" . . . , each of which consisting of one broadcast control channel (BCCH), one downlink-only short data channel (SD) and one downlink-only long data channel (LD).

In addition, FIG. 11(b) shows an example of the composition of the uplink frames in uplink communication from the customer premises equipment to the base station equipment. These uplink frames consist of the unit frames, the "first frame," "second frame," "third frame" . . . , each of which consisting of one link control channel (LCCH), one uplink-only short data channel (SU) and one uplink-only long data channel (LU).

In this manner, the composition of the communication frames shown in this figure is identical to the composition of the communication frames shown in FIG. 10 above except that there is only one short data channel (SD, SU) in each unit frame, for example. Moreover, even in the case that such communication frames are used, because of the composition of communication frames, sending and receiving are performed simultaneously in the base station equipment as shown in FIGS. 11(a) and (b), and sending and receiving are also performed simultaneously in the customer premises equipment as shown in FIGS. 11(c), (d), (e) and (f).

However, in a subscriber wireless access system wherein wireless communication is performed between base station equipment and customer premises equipment at a plurality of locations using communication frames such as those shown in the aforementioned FIGS. 10(a) to 10(f) and FIGS. 11(a) to 11(f), it is necessary to perform sending and receiving simultaneously not only by the base station equipment, but also by the customer premises equipment which is required to have an inexpensive composition. Problems occur, for example, when common send/receive blocks cannot be provided from a hardware standpoint, so the customer premises equipment becomes expensive, and the power consumed by the customer premises equipment becomes large.

The present invention is intended to solve such problems and propose wireless communication using communication frames whereby, the wireless frames themselves are given definitions regarding groups which are sets of customer premises equipment and thus each unit of customer premises equipment does not access the base station equipment with sending and receiving simultaneously. However, in a subscriber wireless access system wherein wireless communication is performed with each of the plurality of units of customer premises equipment assigned to one of the groups among the plurality of groups in this manner, it is necessary to perform adequate study regarding how the assignment of groups is to be performed. To wit, the frequency of occurrence of data received by each unit of customer premises equipment is normally different from the frequency of occurrence of data sent and thus the data flow is asymmetric, so differences occur in the usage of wireless channels between the downlink and uplink, and thus differences occur in the overall system throughput depending on how the groups are assigned.

In addition, the frequency of occurrence of the short data and long data received on the downlink and the frequency of occurrence of the short data and long data sent on the uplink of each unit of customer premises equipment can fluctuate depending on the traffic situation, so differences occur in the usage of wireless channels between the downlink and uplink, and thus differences occur in the overall system throughput depending on how the groups are assigned.

The present invention came about in order to solve the aforementioned problems in the prior art, and has as its object to provide a wireless communications system that is able to increase the system throughput by adopting a protocol wherein each communications station unit is assigned to a group and the sending time band and receiving time band are made different for each communications station unit, and thus, at the time that wireless communication is performed between a base station unit and a plurality of communications station units, a good assignment of groups is achieved.

In addition, in the aforementioned conventional subscriber wireless access system, sufficient study had not been made on the point of improving the efficiency of data communication. Specifically, because the wireless bandwidth is limited and guard time containing no radio signals, a preamble, unique word and the like are inserted at the beginning of each data channel, when the region for sending data is divided in a fixed manner as described above into the SD1 (or SU1), SD2 (or SU2), LD1 (or LU1) to obtain a frame composition with such a data channel composition, there are problems in that the utilization of the communication bandwidth is limited depending on the data content.

The present invention came about in order to solve the aforementioned problems in the prior art, and has as its object to provide a wireless communications system that is able to increase the efficiency of data communication by adopting a protocol wherein each communications station unit is assigned to a group and the sending time band and receiving time band are made different for each communications station unit at the time that wireless communication is performed between a base station unit and a plurality of communications station units.

SUMMARY OF THE INVENTION

Here follows a description of the first mode of the invention.

To attain the above object, with the wireless communications system according to the present invention, a base station unit covers a plurality of communications station units and downlink communication from the base station unit to the communications station unit and uplink communication from the communications station unit to the base station unit are performed wirelessly, wherein: each of the communications station units covered by the base station unit is assigned to one of a plurality of groups that perform receiving or sending in the same time band, each group's communication time band is made different for downlink communication and for uplink communication, and the downlink communication and uplink communication between the base station unit and plurality of communications station units is performed in time-division multiplexing regarding each of the plurality of groups, and at the time of group assignment, the total amount of sending and total amount of receiving are adjusted for each group based on the traffic situation of each communications station unit.

Accordingly, by adjusting the overall amount of data sent and overall amount of data received by each group based on the traffic situation of each communications station unit, it is possible to achieve a good assignment of groups and increase the throughput of the wireless communications system.

Here, as the mode of adjusting the overall amount of data sent and overall amount of data received by each group at the time of assigning groups, it is preferable for this adjustment to be performed immediately prior to the assignment of groups, but the timing at which this adjustment is performed and the timing at which the assignment of these adjusted groups is performed may also be arbitrary timings.

In addition, various metrics may be used for measuring the traffic situation of each communications station unit referenced in order to adjust the overall amount of data sent and overall amount of data received by each group, such as the sending situation or receiving situation of each communications station unit, for example, and more specifically, the amount of data sent from each communications station unit to the base station unit and the amount of data received from the base station unit by each communications station unit (e.g., the amount of data sent from the base station unit to each communications station unit) may be used.

In addition, the overall amount of data sent by each group can be found as the sum total of the quantity of data sent to the base station unit from all communications station units assigned to the same group, the sum total of the number of times that data is sent to the base station unit from all communications station units assigned to the same group, the sum total of the frequency of occurrence of the sending of data to the base station unit from all communications station units assigned to the same group, or the like.

Similarly, the overall amount of data received by each group can be found as the sum total of the quantity of data sent from the base station unit to all communications station units assigned to the same group, the sum total of the number of times that data is sent from the base station unit to all communications station units assigned to the same group, the sum total of the frequency of occurrence of the sending of data to the base station unit from all communications station units assigned to the same group, or the like.

In addition, the overall amount of data sent and overall amount of data received by each group may be the amount actually scheduled to be sent or received in the future by each group, or it may be the amount sent or received in the past by each group, or these may be amounts estimated from these amounts.

In addition, as the way of adjusting the overall amount of data sent and overall amount of data received by each group, it is possible to use ways of adjusting such that the relationship between the overall amount of data sent and overall amount of data received by each group assumes a stipulated relationship. Here, as one example of such a stipulated relationship, the sending time band and receiving time band for each group may be arranged alternately, and when the amount of data that can be sent during this sending time band and the amount of data that can be received during this receiving time band are equal, the relationship between the overall amount of data sent and overall amount of data received by each group may have the relationship of being as close as possible values, or the relationship may be that the overall amount of data sent and overall amount of data received by each group are close values.

In addition, as another example of such a stipulated relationship, the sending time band and receiving time band for each group may be arranged alternately, and when the amount of data that can be sent during this sending time band and the amount of data that can be received during this receiving time band are different, if the ratio between the overall amount of data sent and overall amount of data received by each group has the value P, then the relationship may be such that the ratio between the overall amount of data sent and overall amount of data received by each group is as close to P as possible.

In addition, when setting the communication frames used in wireless communication between a base station unit and a plurality of communications station units, this stipulated relationship can be set based on these communication frames, and specifically, it can be set based on the number of send channels and the number of receive channels in each group constituting these communication frames, or it can be set based on the amount of data that can be sent by and the amount of data that can be received by each group with these communication frames.

In addition, with the wireless communications system according to the present invention, as an example of a preferred constitution, as described below, the base station equipment detects the traffic situation of the various communications station units covered by the local station unit (the base station equipment in question) and assigns groups to the various communications station units.

In passing, in the base station equipment, a traffic situation detection means detects the traffic situation vis-a-vis the various communications station units, a group assignment means assigns the various communications station units to groups based on the results detected by the traffic situation detection means, and a group assignment result notification means uses wireless communication to notify the communications station units of information based on the results of the group assignment by the group assignment means. Then, in the various communications station units, based on the information reported from the base station equipment, a group communication control means performs downlink communication and uplink communication as the group to which the local station unit (each of the communications station units in question) is assigned.

Here, the information used as information based on the group assignment results reported to the communications station unit may be, for example, the content of the group assignment results, or only those portions found to have changed upon comparing the new group assignment results against the previous group assignment results.

In this manner, this information may be reported to all communications station units covered by the base station equipment, for example, or it may be reported to only those communications station units for which there was a change in group assignment.

In addition, with the wireless communications system according to the present invention, as a preferred mode, the various communications station units are assigned to groups based on a comparison of the amount of data sent and the amount of data received per stipulated unit time for each communications station unit.

Here, various lengths of time may be used as the stipulated unit time, as it is possible to use a mode wherein the group assignment is performed every stipulated unit time and then the group assignment is changed.

In addition, as the comparison of the amount of data sent and the amount of data received by each communications station unit, it is possible to use the difference between this amount of data sent and the amount of data received, or the ratio between this amount of data sent and the amount of data received or a time-averaged value of this difference and this ratio.

In addition, with the wireless communications system according to the present invention, as a preferred mode, the various communications station units are assigned to groups so that they reduce the empty time that occurs in the downlink and uplink communication of each group. Thereby, it is possible to reduce the wasted empty time that occurs in the wireless communication performed between base station equipment and a plurality of communications station units, and also increase the throughput of the entire wireless communications system.

Here, the "empty time that occurs in the downlink and uplink communication of each group" may be defined to be the sum of the empty time that occurs in the downlink communication and the empty time that occurs in the uplink communication. In addition, the "empty time that occurs in the downlink communication" may be the time, for each group, in which no downlink communication is performed from the base station unit to any of the communications station units within the communications station units assigned to the same group. Similarly, the "empty time that occurs in the uplink communication" may be the time, for each group, in which no uplink communication is performed from the base station unit to any of the communications station units within the communications station units assigned to the same group.

In addition, as a mode of reducing this empty time, it is preferable to use a mode that minimizes time or a mode that maximizes the throughput of wireless communications within the range possible.

Note that this reducing the empty time is equivalent to increasing the communication efficiency of the system, so minimizing this empty time as much as possible is equivalent to maximizing the communication efficiency of the system.

In addition, in the event that a base station unit and a plurality of communications station units perform wireless communication using set communication frames, for example, reducing the empty time as described above is equivalent to increasing the utilization ratio of the communication frames in question, so minimizing this empty time as much as possible is equivalent to maximizing the utilization ratio of the communication frames in question.

In addition, with the wireless communications system according to the present invention, as an example of a constitution, each group's downlink communication frames for performing downlink communication and each group's uplink communication frames for performing uplink communication may be placed in different time bands from the downlink communication frames and uplink communication frames of the same group, so wireless communication may be performed between a base station unit and a plurality of communications station units by means of communication frames disposed in a plurality of groups.

In addition, with the wireless communications system according to the present invention, as an example of a preferred constitution, a plurality of four or more groups is provided, and communication time bands are provided for other groups between the downlink time band and uplink time band of each group.

In addition, in such a wireless communications system according to the present invention, as an example of a constitution, downlink communication for each group is performed using a combination of a plurality of downlink traffic channels, and uplink communication for each group is performed using a combination of a plurality of uplink traffic channels, and so that the traffic channels of other groups are placed between the downlink traffic channel and uplink traffic channel of the same group, a downlink traffic channel block disposed with a plurality of downlink traffic channels for each group on each downlink traffic channel is disposed for a plurality of downlink traffic channels, and an uplink traffic channel block disposed with a plurality of uplink traffic channels for each group on each uplink traffic channel is disposed for a plurality of uplink traffic channels.

Here follows a description of the advantages of the wireless communications system according to the present invention presented by means of specific examples.

In this example, let there be four communications station units covered by one base station unit, and the number of send channels used and number of receive channels used within a certain time range of each communications station unit be those indicated by (1) through (4) below. In addition, let Group A and Group B be provided as groups. The send channels used in sending and the receive channels used in receiving by Groups A and B are lined up alternately within the communication frames. Let the size of each send channel (amount of data that can be sent) be equal to the size of each receive channel (amount of data that can be received).

(1) In communications station unit 1, number of send channels used: number of receive channels used=3:7.
(2) In communications station unit 2, number of send channels used: number of receive channels used=4:6.
(3) In communications station unit 3, number of send channels used: number of receive channels used=6:4.
(4) In communications station unit 4, number of send channels used: number of receive channels used=7:3.

At this time, if the present invention is not applied and the way of assigning the communications station units 1-4 to groups is not taken into consideration, consider a mode in which communications station unit 1 and communications station unit 2 are assigned to Group A and communications station unit 3 and communications station unit 4 are assigned to Group B. In this mode, the total number of send channels used by Group A is 7 (=3+4) and the total number of receive channels used by Group A is 13 (=7+6), while the total number of send channels used by Group B is 13 (=6+7) and the total number of receive channels used by Group B is 7 (=4+3).

Doing so, in this mode, the time required to complete all sending and receiving of data by all of the communications station units 1 and 2 assigned to Group A is determined by the number of receive channels which is the larger number of channels used, so this time is equal to the time for 13 channels in receiving. Similarly, in this mode, the time required to complete all sending and receiving of data by all of the communications station units 3 and 4 assigned to Group B is determined by the number of send channels which is the larger number of channels used, so this time is equal to the time for 13 channels in sending.

Here, as an example, if the aforementioned send channels and receive channels are LD channels and the number of LD channels that can be sent or received in one frame is 1, then the number of channels=number of frames, so in this mode, in order to complete the sending and receiving of all data by all of the communications station units 1-4, 26 (=13+13) frames worth of time would be required.

Moreover, in Group A, the ratio of send frames used is 7/13 and the ratio of receive frames used is 13/13, while in Group B, the ratio of send frames used is 13/13 and the ratio of receive frames used is 7/13. Thus, in this mode, there are 6 channels worth of empty frames in both the sending of Group A and the receiving of Group B, so the overall throughput of the wireless communications system is not good.

On the other hand, when the present invention is applied, let us examine a mode wherein communications station unit 1 and communications station unit 4 are assigned to Group A while communications station unit 2 and communications station unit 3 are assigned to Group B. To wit, the total sending amount and total receiving amount of Groups A and B are set to as close as possible of values (preferably equal values) and the empty time occurring in communications between Groups A and B is made as small as possible (preferably zero). In this mode, the total number of send channels used by Group A is 10 (=3+7) and the total number of receive channels used by Group A is 10 (=4+6), while the total number of send channels used by Group B is 10 (=4+6) and the total number of receive channels used by Group B is 10 (=6+4).

Doing so, in this mode, the time required to complete all sending and receiving of data by all of the communications station units 1 and 4 assigned to Group A is determined by the number of receive channels which is the larger number of channels used, and in this mode the number of send channels is equal to the number of receive channels, so this time is equal to the time for 10 channels in receiving (or in sending). Similarly, in this mode, the time required to complete all sending and receiving of data by all of the communications station units 2 and 3 assigned to Group B is determined by the number of send channels which is the larger number of channels used, and in this mode the number of send channels is equal to the number of receive channels, so this time is equal to the time for 10 channels in sending (or in receiving).

Here, as an example, if the aforementioned send channels and receive channels are LD channels and the number of LD channels that can be sent or received in one frame is 1, then the number of channels=number of frames, so in this mode, in order to complete the sending and receiving of all data by all of the communications station units 1-4, 20 (=10+10) frames worth of time would be required.

Moreover, in Group A, the ratio of send frames used is 10/10 and the ratio of receive frames used is 10/10, while in Group B, the ratio of send frames used is 10/10 and the ratio of receive frames used is 10/10. Thus, in this mode, the ratio of both send frames and receive frames used is 100% for both Group A and Group B, so the number of unused empty frames is zero, and by applying the optimal assignment of groups in this manner, the overall throughput of the wireless communications system is optimized.

In this manner, with the wireless communications system according to the present invention, taking note of the difference in the system throughput depending on the way of assigning groups, by controlling the assignment of groups with respect to the communications station units so that the all of the send channels and receive channels contained within the traffic frames for each of the groups are used, or a similar state is achieved, the overall throughput of the wireless communications system can be optimized.

Here follows a description of the second mode of the invention.

To attain the above object, with the wireless communications system according to the present invention, a base station unit covers a plurality of communications station units and downlink communication from the base station unit to the communications station unit and uplink communication from the communications station unit to the base station unit are performed wirelessly, wherein: each of the communications station units covered by the base station unit is assigned to one of a plurality of groups that perform receiving or sending in the same time band, each group's communication time band is made different for downlink communication and for uplink communication, frames containing short data channels for sending short data and long data channels for sending long data are used to perform downlink communication and uplink communication between the base station unit and plurality of communications station units in time-division multiplexing regarding each of the plurality of groups, and at the time of group assignment, regarding one or more of the downlink short data channels, uplink short data channels, downlink long data channels, and the uplink long data channels, the total number of data channels used by each group are adjusted based on the number of data channels used by each communications station unit.

Accordingly, by adjusting the total number of downlink short data channels used, total number of uplink short data channels used, total number of downlink long data channels used and total number of uplink long data channels used by each group based on the number of downlink short data channels used, number of uplink short data channels used, number of downlink long data channels used and number of uplink long data channels used by each communications station unit, it is possible to achieve a good assignment of groups and increase the throughput of the wireless communications system.

Here, various types of wireless communications systems, base station units and communications station units can be used.

In addition, various numbers of communications station units can be used as those covered by the base station unit.

In addition, various constitutions can be used as the constitution of frames used in communication.

In addition, various numbers can be used as the number of short data channels contained in one frame and the number of long data channels contained in one frame.

In addition, the channels subject to adjustment of the total number of data channels used by each group can be one or more of those selected from the aforementioned downlink short data channels, uplink short data channels, downlink long data channels and uplink long data channels, and any combination of any data channels may also be subject to adjustment.

Specific possible combinations include, for example: making the downlink short data channels and downlink long data channels subject to adjustment; making the uplink short data channels and uplink long data channels subject to adjustment; making the downlink short data channels and uplink short data channels subject to adjustment; making the downlink long data channels and uplink long data channels subject to adjustment; and making the downlink short data channels, downlink long data channels, uplink short data channels and uplink long data channels subject to adjustment.

In addition, as the number of data channels used by each communications station unit, it is possible to use the number of data channels planned to be used for sending or receiving in the future for each communications station unit, or it is possible to use the number of data channels used for sending or receiving in the past for each communications station unit, or it is possible to use numbers estimated from these numbers or the like.

In addition, as the mode of adjusting the total number of data channels used by each group at the time of assigning groups, it is preferable for this adjustment to be performed immediately prior to the assignment of groups, but the timing at which this adjustment is performed and the timing at which the assignment of these adjusted groups is performed may also be arbitrary timings.

In addition, as the way of adjusting the overall amount of data channels used by each group, it is possible to use various ways of adjusting. For example, it is possible to use a way of adjusting so that the number of frames used for communication is minimized or reduced based on the number of short data channels or number of long data channels contained in the frame, for example, or the number of short data channels or number of long data channels assigned to each group, for example.

Specifically, it is possible to use a way of adjusting such that, for example, the ratio of the total number of downlink short data channels used to the total number of downlink long data channels used in each group is identical or near to the ratio of the number of downlink short data channels to the number of downlink long data channels contained in each frame, or the ratio of the total number of uplink short data channels used to the total number of uplink long data channels used in each group is identical or near to the ratio of the number of uplink short data channels to the number of uplink long data channels contained in each frame, or the number of frames used in downlink communication in each group is identical or near to the number of frames used in uplink communication, or the number of frames used in communication in each group is identical or near to that of another group.

In addition, as a preferred mode, for example, a mode may be used wherein the various communications station units are assigned to groups based on the number of data channels used per stipulated unit time for each communications station unit. In addition, for example, a mode may be used wherein the assignment of groups is performed every stipulated unit time and the group assignment is changed.

Note that various lengths of time may be used as the stipulated unit time.

In addition, with the wireless communications system according to the present invention, as an example of a preferred constitution, as described below, the base station equipment detects the number of data channels used by the various communications station units covered by the local station unit (the base station equipment in question) and assigns the various communications station units to groups.

To wit, in the base station equipment, a number of data channels used detection means detects the number of short data channels used and the number of long data channels used by the various communications station units regarding one or both of downlink communication and uplink communication, a group assignment means adjusts the number of short data channels used and the number of long data channels used by the various groups based on the results detected by the number of data channels used detection means and assigns the various communications station units to groups, and a group assignment result notification means uses wireless communication to notify the communications station units of information based on the results of the group assignment by the group assignment means. In addition, in the various communications station units, based on the information reported from the base station equipment, a group communication control means performs downlink communication and uplink communication as the group to which the local station unit (each of the communications station units in question) is assigned.

Here, the number of data channels used detection means may detect, for example, the number of downlink short data channels used, the number of uplink short data channels used, the number of downlink long data channels used and the number of uplink long data channels used.

In addition, the group assignment means may adjust, for example, the total number of downlink short data channels used by each group, the total number of uplink short data channels used by each group, the total number of downlink long data channels used by each group and the total number of uplink long data channels used by each group.

In addition, the information used as information based on the group assignment results reported to the communications station unit may be, for example, the content of the group assignment results, or only those portions found to have changed upon comparing the new group assignment results against the previous group assignment results.

In this manner, this information may be reported to all communications station units covered by the base station equipment, for example, or it may be reported to only those communications station units for which there was a change in group assignment.

In addition, with the wireless communications system according to the present invention, as a preferred mode, the various communications station units are assigned to groups so that they reduce the empty time that occurs in the downlink and uplink communication of each group. Thereby, it is possible to reduce the wasted empty time that occurs in the wireless communication performed between base station equipment and a plurality of communications station units, and also increase the throughput of the entire wireless communications system.

Here, the "empty time that occurs in the downlink and uplink communication of each group" may be defined to be the sum of the empty time that occurs in the downlink communication and the empty time that occurs in the uplink communication. In addition, the "empty time that occurs in the downlink communication" may be the time, for each group, in which no downlink communication is performed from the base station unit to any of the communications station units within the communications station units assigned to the same group. Similarly, the "empty time that occurs in the uplink communication" may be the time, for each group, in which no uplink communication is performed from the base station unit to any of the communications station units within the communications station units assigned to the same group.

In addition, as a mode of reducing this empty time, it is preferable to use a mode that minimizes time or a mode that maximizes the throughput of wireless communications within the range possible.

Note that this reducing the empty time is equivalent to increasing the communication efficiency of the system, so minimizing this empty time as much as possible is equivalent to maximizing the communication efficiency of the system.

In addition, in the event that a base station unit and a plurality of communications station units perform wireless communication using set communication frames, for example, reducing the empty time as described above is equivalent to increasing the utilization ratio of the communication frames in question, so minimizing this empty time as much as possible is equivalent to maximizing the utilization ratio of the communication frames in question.

In addition, with the wireless communications system according to the present invention, as an example of a constitution, each group's downlink communication frames for performing downlink communication and each group's uplink communication frames for performing uplink communication may be placed in different time bands from the downlink communication frames and uplink communication frames of the same group, so wireless communication may be performed between a base station unit and a plurality of communications station units by means of communication frames disposed in a plurality of groups.

In addition, with the wireless communications system according to the present invention, as an example of a constitution, a plurality of four or more groups is provided, and communication time bands are provided for other groups between the downlink time band and uplink time band of each group. In addition, with the wireless communications system according to the present invention, as an example of a constitution, downlink communication for each group is performed using a combination of a plurality of downlink traffic channels, and uplink communication for each group is performed using a combination of a plurality of uplink traffic channels, and so that the traffic channels of other groups are placed between the downlink traffic channel and uplink traffic channel of the same group, a downlink traffic channel block disposed with a plurality of downlink traffic channels for each group on each downlink traffic channel is disposed for a plurality of downlink traffic channels, and an uplink traffic channel block disposed with a plurality of uplink traffic channels for each group on each uplink traffic channel is disposed for a plurality of uplink traffic channels.

In addition the present invention provides the base station unit and communications station unit used in the aforementioned wireless communications system.

The base station unit according to the present invention is used in a wireless communications system in which the base station unit covers a plurality of communications station units and downlink communication from the base station unit to the communications station unit and uplink communication from the communications station unit to the base station unit are performed wirelessly, each of the communications station units covered by the base station unit is assigned to one of a plurality of groups that perform receiving or sending in the same time band, each group's communication time band is made different for downlink communication and for uplink communication, frames containing short data channels for sending short data and long data channels for sending long data are used to perform downlink communication and uplink communication between the base station unit and plurality of communications station units in time-division multiplexing regarding each of the plurality of groups. Moreover, the base station unit according to the present invention detects the number of data channels used by the various communications station units regarding one or more of the downlink short data channels, uplink short data channels, downlink long data channels, and the uplink long data channels, and based on the results detected by the number of data channels used detection means, assigns the various communications station units to groups, and uses wireless communication to notify the communications station units of information based on the results of the group assignment by the group assignment means.

In addition, the communications station unit according to the present invention is used in a wireless communications system in which the base station unit covers a plurality of communications station units and downlink communication from the base station unit to the communications station unit and uplink communication from the communications station unit to the base station unit are performed wirelessly, each of the communications station units covered by the base station unit is assigned to one of a plurality of groups that perform receiving or sending in the same time band, each group's communication time band is made different for downlink communication and for uplink communication, frames containing short data channels for sending short data and long data channels for sending long data are used to perform downlink communication and uplink communication between the base station unit and plurality of communications station units in time-division multiplexing regarding each of the plurality of groups, and at the time of group assignment, regarding one or more of the downlink short data channels, uplink short data channels, downlink long data channels, and the uplink long data channels, the total number of data channels used by each group are adjusted based on the number of data channels used by each communications station unit. Moreover, in the base station unit according to the present invention, based on the information reported from the base station equipment, a group communication control means performs downlink communication and uplink communication as the group to which the local station unit is assigned.

Here follows a description of the advantages of the wireless communications system according to the present invention presented by means of specific examples.

In this example, in order to simplify the description, we shall consider only the uplink data channels sent from the communications station unit to the base station unit. Note that the following description applies similarly when considering downlink data channels received by the communications station unit from the base station unit, and when considering both the uplink and downlink directions, the calculations can be performed by simply increasing the number of parameters, for example.

In addition, in this example, let there be four communications station units covered by one base station unit, and the number of short data channels used and number of long data channels used in the uplink direction within a certain time range of each communications station unit be those indicated by (1) through (4) below. In addition, let Group A and Group B be provided as groups. The ratio of short data channels to long data channels that can be used for sending by the Groups A and B is 2 to 1. Specifically, one communication frame contains two short data channels and one long data channel.

(1) In communications station unit 1, number of short data channels used: number of long data channels used=6:7.
(2) In communications station unit 2, number of short data channels used: number of long data channels used=8:6.
(3) In communications station unit 3, number of short data channels used: number of long data channels used=12:4.
(4) In communications station unit 4, number of short data channels used: number of long data channels used=14:3.

At this time, if the present invention is not applied and the way of assigning the communications station units 1-4 to groups is not taken into consideration, consider a mode in which communications station unit 1 and communications station unit 2 are assigned to Group A and communications station unit 3 and communications station unit 4 are assigned to Group B. In this mode, the total number of short data channels used by Group A is 14 (=6+8) and the total number of long data channels used by Group A is 13 (=7+6), while the total number of short data channels used by Group B is 26 (=12+14) and the total number of long data channels used by Group B is 7 (=4+3).

Doing so, in this mode, the time required to complete all sending of data by all of the communications station units 1 and 2 assigned to Group A is equal to the time for 7 (=14/2) frames for short data channels, and the time for 13 frames for long data channels. Similarly, in this mode, the time required to complete all sending of data by all of the communications station units 3 and 4 assigned to Group B is equal to the time for 13 (=26/2) frames for short data channels, and the time for 7 frames for long data channels.

Here, we shall calculate the usage ratio for short data channels and long data channels per 13 frames. Note that 13 frames contain 26 short data channels and 13 long data channels.

In Group A, the ratio of short data channels used is 14/26 and the ratio of long data channels used is 13/13, while in Group B, the ratio of short data frames used is 26/26 and the ratio of long data channels used is 7/13. Thus, in this mode, there are 6 frames worth (12 short data channels or 6 long data channels) of empty data channels in both Group A and Group B, so the overall throughput of the wireless communications system is not good.

On the other hand, when the present invention is applied, let us examine a mode wherein communications station unit 1 and communications station unit 4 are assigned to Group A while communications station unit 2 and communications station unit 3 are assigned to Group B. To wit, the ratio of the number of short data channels used to the number of long data channels used by Groups A and B is set to as close as possible of a value to (preferably a value equal to) the ratio of the short data channels to the long data channels contained in a frame, and the empty time occurring in communications between Groups A and B is made as small as possible (preferably zero). In this mode, the total number of short data channels used by Group A is 20 (=6+14) and the total number of long data channels used by Group A is 10 (=7+3), while the total number of short data channels used by Group B is 20 (=8+12) and the total number of long data channels used by Group B is 10 (=6+4).

Doing so, in this mode, the time required to complete all sending of data by all of the communications station units 1 and 4 assigned to Group A is equal to the time for 10 frames. Similarly, in this mode, the time required to complete all sending of data by all of the communications station units 2 and 3 assigned to Group B is equal to the time for 10 frames.

Moreover, in Group A, the ratio of send frames used is 10/10, while in Group B, the ratio of send frames used is 10/10. Thus, in this mode, the usage ratio of send frames is 100% for both Group A and Group B, so the number of unused empty frames is zero, and by applying the optimal assignment of groups in this manner, the overall throughput of the wireless communications system is optimized.

In this manner, with the wireless communications system according to the present invention, taking note of the difference in the system throughput depending on the way of assigning groups, by controlling the assignment of groups with respect to the communications station units so that the all of the short data channels and long data channels contained within the traffic frames for each of the groups are used, or a similar state is achieved, the overall throughput of the wireless communications system can be optimized.

Here follows a description of the third mode of the invention.

To attain the above object, with the wireless communications system according to the present invention, when a base station unit covers a plurality of communications station units and downlink communication from the base station unit to the communications station unit and uplink communication from the communications station unit to the base station unit are performed wirelessly, data communication is performed as follows.

To wit, each of the communications station units covered by the base station unit is assigned to one of a plurality of groups that perform receiving or sending in the same time band, each group's communication time band is made different for downlink communication and for uplink communication, when frames (communication frames) containing a region for sending data (data sending region) are used to perform downlink communication and uplink communication between the base station unit and plurality of communications station units in time-division multiplexing regarding each of the plurality of groups, and in one or both of downlink communication and uplink communication, data communication may be performed using all of the region for sending data (data sending region) contained within the frame as a single data channel, depending on the traffic situation.

Accordingly, depending on the traffic situation, the communication of data may be performed by taking the entire data sending region contained within a frame as a single data channel, so the efficiency of data communication can be improved in comparison to the prior art.

Specifically, depending on the traffic situation, the communication of data can be performed by switching between performing data communication by dividing the data sending region contained within a frame into two or more segments, and performing data communication by not dividing the data sending region contained within a frame and using it as a single unit, thereby achieving the efficient communication of data depending on the traffic situation. To wit, when the data to be sent is not too long, the data sending region contained within the frame is divided and used as segments, but when the data to be sent is extremely long, the data sending region contained within the frame is not divided and used as a whole to send the extremely long data unit all at once.

Here, various types of wireless communications systems, base station units and communications station units can be used.

In addition, various numbers of communications station units can be used as those covered by the base station unit.

In addition, various constitutions can be used as the constitution of frames used in communication. Specifically, various numbers can be used as the number of short data channels contained in one frame and the number of long data channels contained in one frame.

In addition, the data sending regions contained within the frame may be regions with various positions and sizes. Here a "data sending region" may be defined to be, for example, a region consisting of the region of all short data channels combined with the region of all long data channels contained within the frame. In the present invention, by assigning this region to one data channel and using it for data communication, the efficiency the communication of data longer than the long data channel, for example, can be improved.

Note that in the event that the region for sending data is divided into a plurality of regions provided on one frame, a mode wherein, for example, one of this plurality of regions is assumed to be the region for sending data (data sending region) according to the present invention may also be used. To wit, because taking all of the plurality of divided regions as a single data channel is not thought to be ordinarily performed, we focus on a single contiguous region and take this entire region to be a single data channel.

In addition, the present invention may be applied to only one of downlink communication or uplink communication, or it may be applied to both.

In addition, various modes may be used as the mode of controlling the usage of the data sending region depending on the traffic situation. For example, a mode may be used wherein, depending on the length of the data to be sent, control is exerted so that data channels of either length are used and set as the data sending region.

In addition, as the mode wherein the entire data sending region contained within the frame is used as one data channel, a mode in which data is contained within this entire data sending region need not necessarily be used, but rather, a mode may be used wherein guard time, preambles, unique words or the like are provided at the beginning of this data sending region.

Note that as an example of the constitution, a mode may be adopted wherein each group's downlink communication frames for performing downlink communication and each group's uplink communication frames for performing uplink communication may be placed in different time bands from the downlink communication frames and uplink communication frames of the same group, so wireless communication may be performed between a base station unit and a plurality of communications station units by means of communication frames disposed in a plurality of groups. In addition, as another example of a constitution, a plurality of four or more groups is provided, and communication time bands are provided for other groups between the downlink time band and uplink time band of each group.

In addition, in the wireless communications system according to the present invention, a constitution may be used wherein data channels of arbitrary length are set in the data sending region contained within a frame and then data communication can be performed between a base station unit and communications station unit. With such a constitution, in downlink communication and uplink communication, the length of the data channel used for data communication can be set to a variable length depending on the traffic situation, for example. In addition, with such a constitution, information (length and positions and the like) regarding the data channels set up in the data sending region may be reported between the base station unit and communications station unit, and thus the length and positions of the data channels set up in the data sending region may be synchronized to each other.

Here, the length of the data channel that can be set up in the data sending region may be the same length as this data sending region, or any length shorter than this data sending region.

In addition, with the wireless communications system according to the present invention, as a preferred example of a constitution, in one or both of downlink communication and uplink communication, data communication is performed by variably using: a short data channel for sending short data consisting of a portion of a region for sending data contained within a frame (a data sending region) used as a single data channel, a long data channel for sending long data consisting of a portion of a region for sending data contained within a frame (a data sending region) used as a single data channel, or an extra-long data channel consisting of all of a region for sending data contained within a frame (a data sending region) used as a single data channel.

Here, various lengths and numbers can be used as the length and number of the short data channels, while various lengths and numbers can be used as the length and number of the long data channels. Note that as described above, the data channels are, in order of decreasing length, the extra-long data channel, long data channel and the short data channel.

In addition, various modes may be used as the mode of performing data communication variably using the short data channel, long data channel and extra-long data channel, for example, a mode wherein data communication is performed using the smallest data channel into which the data to be sent fits, and a mode in which data to be sent that is longer than the extra-long data channel is divided before data communication is performed.

In addition, the present invention provides the base station unit and communications station unit used in the aforementioned wireless communications system.

As an example, with the station units according to the present invention, in one or both of downlink communication and uplink communication, a data communication control means performs data communication with another station unit in order to synchronize with the other station unit the timing of using an extra-long data channel consisting of all of a region for sending data contained within a frame (a data sending region) as a single data channel, and then performs data communication with the other station.

In addition, the station units according to the present invention may be used as the base station unit or communications station unit in a wireless communications system wherein: a base station unit covers a plurality of communications station units and downlink communication from the base station unit to the communications station unit and uplink communication from the communications station unit to the base station unit are performed wirelessly, each of the communications station units covered by the base station unit is assigned to one of a plurality of groups that perform receiving or sending in the same time band, each group's communication time band is made different for downlink communication and for uplink communication, frames containing a region for sending data (data sending region) are used, and the downlink communication and uplink communication between the base station unit and plurality of communications station units is performed in time-division multiplexing regarding each of said plurality of groups.

Here, the communication with the other station unit is communication with the communications station unit in the case that the present invention is applied to the base station unit, and similarly, it is communication with the base station unit in the case that the present invention is applied to the communications station unit.

In addition, as the mode of synchronizing with the other station unit the timing of using an extra-long data channel consisting of all of a data sending region within a frame as a single data channel, for example, a mode of setting the timing in question to the same timing as that of the other station unit may be used.

DESCRIPTION OF THE PREFERRED EMBODIMENTS

Figure 1:
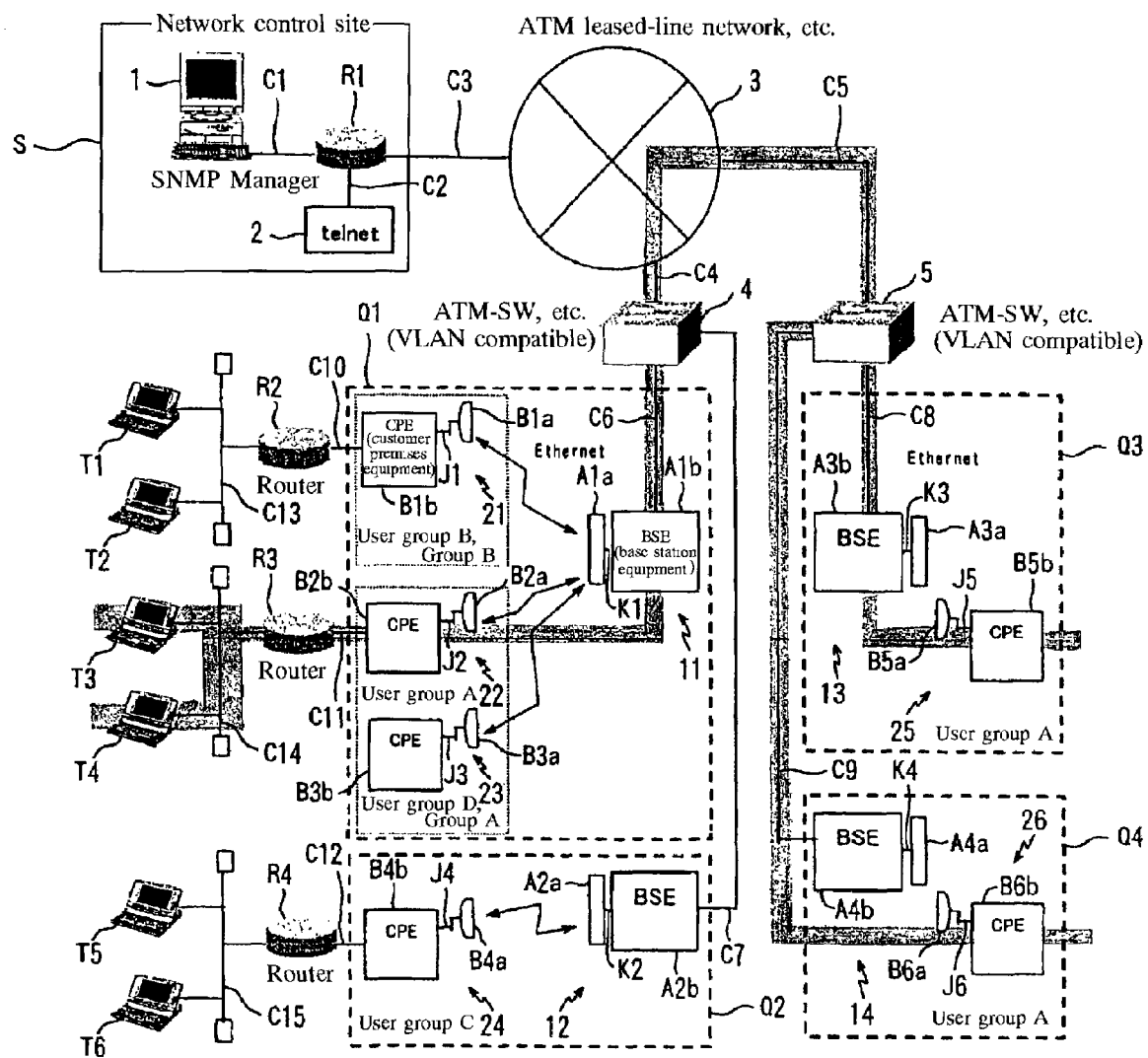
FIG. 1 is a diagram of an example of the constitution of a subscriber wireless access system which is one example of a wireless communications system.

Here follows a description of embodiments of the present invention made with reference to drawings.

As examples of a wireless communications system that performs wireless communication using communication frames such that the wireless frames themselves are given definitions regarding groups which are sets of customer premises equipment and thus each unit of customer premises equipment does not access the base station equipment with sending and receiving simultaneously, we shall first describe Example 1 and Example 2.

We shall first describe the wireless communications system according to Example 1.

In Example 1, with a wireless communications system that performs wireless communication between a base station unit and a plurality of communications station units and such a base station unit and communications station unit, the intent is to provide a wireless communications system wherein the receive time band and send time band of the communications station unit are made different and a base station unit and communications station unit. In addition, by having the communications station unit used as the customer premises equipment or the like perform sending and receiving simultaneously, it is possible to solve the typical problems in P-MP wireless communications systems of high cost and high power consumption, thereby achieving an inexpensive communications station unit with low power consumption.

Specifically, in the wireless communications system according to Example 1, as described below, a base station unit covers a plurality of communications station units, and the downlink communication from the base station unit to communications station unit and the uplink communication from the communications station unit to base station unit are performed wirelessly.

To wit, a plurality of groups are provided to perform reception (downlink communication) on the same time band and perform sending (uplink communication) on the same time band (to wit, they perform sending and receiving on the same time band), and each of the communications station units covered by the base station unit is assigned to one of the groups, so that the communication time band of each group is made different for the downlink communication and uplink communication, and wireless communication is performed with a constitution wherein the downlink communication and uplink communication of the base station unit and plurality of communications station units is performed with time-division multiplexing regarding a plurality of groups for each.

Accordingly, by providing a plurality of groups to perform reception (downlink communication) on the same time band and perform sending (uplink communication) on the same time band, and assigning each of the communications station units covered by the base station unit to one of the groups, so that the communication time band of each group is made different for the downlink communication and uplink communication, the receiving time band and sending time band of the communications station unit are made different, so in comparison to the prior art, it is possible to achieve a less expensive communications station unit with lower power consumption that can be used as customer premises equipment or the like.

In addition, the downlink communication and uplink communication between a base station unit and plurality of communications station unit are performed by time-division multiplexing regarding a plurality of groups, so in the base station unit, for example, it is possible to perform downlink communication and uplink communication continuously, and thus the efficiency of wireless communications can be secured.

In this manner, communications station units assigned to the same group perform downlink communication in the same time band set for that group, and also perform uplink communication in the same time band set for that group. In addition, the time band for downlink communication is different for each group and also the time band for uplink communication is different for each group.

Here, different numbers can be used as the number of the plurality of communications station units covered by the base station unit, and this number may be set in a fixed manner or it can be varied dynamically depending on the traffic situation or the like. In addition, the communications station units covered by the base station unit may be set in a fixed manner or can be varied dynamically depending on the movement of communications station units or the like.

In addition, the communications station unit may be a unit that is installed in a fixed manner or a mobile unit.

Note that in the base station unit, all of the communications station units present in range of the base station unit in question, or that portion required for communication, are authenticated as other parties in communication, and wireless communication is performed by covering the authenticated communications station units as other parties in communication.

In addition, as the mode of assigning the various communications station units covered by the base station unit to one of the groups, a mode of fixed assignment in advance may be used, or a mode of dynamic assignment depending on the traffic situation or the like may also be used.

In addition, the number of the plurality of groups may be two or greater.

In addition, there is no particular limit to the number of communications station units assigned to one group, as this may be one or a plurality. Note that at least a plurality of communications station units is assigned to one group.

In addition, various modes can be used as the mode whereby the communication time bands are made different between downlink communication and uplink communication of each group, and communication is performed by time-division multiplexing regarding a plurality of groups in downlink communication and uplink communication, respectively, between the base station unit and the plurality of communications station units. Note that in the constitution according to Example 1, if the receiving time band and sending time band of the communications station unit are different, this also includes a mode wherein information for allowing the communications station units belonging to a certain group to be synchronized to the base station unit is received on the communications time band of another group.

In addition, the station units according to Example 1 may be used as the base station unit or communications station unit in a wireless communications system wherein: a base station unit covers a plurality of communications station units and downlink communication from the base station unit to the communications station unit and uplink communication from the communications station unit to the base station unit are performed wirelessly, and wireless communication is performed in the same manner as above.

To wit, a plurality of groups are provided to perform reception on the same time band and perform sending on the same time band (to wit, they perform sending and receiving on the same time band), and each of the communications station units covered by the base station unit is assigned to one of the groups, so that the communication time band of each group is made different for the downlink communication and uplink communication, and wireless communication is performed using a communications protocol wherein the downlink communication and uplink communication of the base station unit and plurality of communications station units are performed with time-division multiplexing regarding a plurality of groups for each.

Accordingly, in the same manner as in the above, it is possible to achieve a communications station unit that is less expensive and has lower power consumption than in the prior art.

Note that the station unit according to Example 1 may be used as the base station unit, or it may be used as the communications station unit.

In addition, with the station unit according to Example 1, as an example, wireless communication may be performed by means of the following communication frames.

To wit, each group's downlink communication frames for performing downlink communication and each group's uplink communication frames for performing uplink communication may be placed in different time bands from the downlink communication frames and uplink communication frames of the same group, so wireless communication may be performed between a base station unit and a plurality of communications station units by means of communication frames disposed in a plurality of groups.

Accordingly, by performing wireless communication using such communication frames, it is possible to achieve a mode wherein sending and receiving by a communications station unit are performed in different time bands, and thus as described above, it is possible to achieve a communications station unit that is less expensive and has lower power consumption than in the prior art.

Note that various modes are possible as the mode wherein the downlink communication frames and uplink communication frames of the same group are placed in different time bands.

Here follows a detailed description of a preferred embodiment of the wireless communications system according to Example 1.

First, we shall present one example of a wireless communications system used in this preferred embodiment. Note that this preferred embodiment presents the case of the constitution according to Example 1 applied to a subscriber wireless access system.

FIG. 1 shows an example of the constitution of a subscriber wireless access system as one example of the wireless communications system according to Example 1.

As shown in the figure, the subscriber wireless access system according to this preferred embodiment consists of a network control site S, network 3 consisting of an ATM (Asynchronous Transfer Mode) leased-line network, switch blocks 4 and 5 each consisting of a VLAN (Virtual LAN) compatible ATM-SW (switch) and the like, and a plurality of units of base station equipment 11-14 and a plurality of units of customer premises equipment 21-26. In addition, connected to customer premises equipment 21, 22 and 24 via circuits C10-C12, routers R2-R4 and LAN circuits C13-C15 are a plurality of communications terminal units T1-T6 consisting of personal computers or the like.

The network control site S consists of a terminal unit 1 which has SNMP (Simple Network Monitoring Protocol) manager functions, connected via circuit C1 to router R1, along with a telnet function block 2 connected via circuit C2 to this router R1. In addition, router R1 is also connected via circuit C3 to the network 3.

Switch block 4 is connected via circuit C4 to the network 3 and is also connected via Ethernet® circuits C6 and C7 to a plurality of units of base station equipment 11 and 12

Similarly, switch block 5 is connected via circuit C4 to the network 3 and is also connected via Ethernet® circuits C8 and C9 to a plurality of units of base station equipment 13 and 14.

In addition, each of the units of base station equipment 11-14 consists of one of outdoor units A1*a*-A4*a* and one of indoor units A1*b*-A4*b*, connected via one of cables K1-K4, and similarly, each of the units of customer premises equipment 21-26 consists of one of outdoor units B1*a*-B4*a* and one of indoor units B1*b*-B4*b*, connected via one of cables J1-J4. In addition, each of the outdoor units A1*a*-A4*a* and B1*a*-B4*a* is equipped with an antenna.

In addition, each of the units of base station equipment 11-14 forms one of the service areas Q1-Q4 indicated by broken lines in FIG. 1, thereby covering the units of customer premises equipment 21-26 present within service areas Q1-Q4 as other parties in communication.

In addition, the various units of customer premises equipment 21-26 are divided into four groups called "User Group A" through "User Group D," and related units of customer premises equipment 21-26 belong to each group. In addition, it is possible for only those units of customer premises equipment 21-26 belonging to a group to be connected to that group for communication. FIG. 1 shows an example in which the units of customer premises equipment 22, 25 and 26 belonging to "User Group A" are connected for communication.

Here, the control for making only those units of customer premises equipment 21-26 belonging to the same group to be connected for communication can be performed by having the base station equipment 11-14 control the group identifier information (group ID) of customer premises equipment 21-26, for example. Note that the base station equipment 11-14 may also control the individual identifier information (individual ID) of customer premises equipment 21-26.

In addition, in this example, when one unit of base station equipment covers a plurality of units of customer premises equipment, for example, this plurality of units of customer premises equipment is divided into a plurality of groups, as described later, wireless communication is performed with the base station equipment using different time bands for each group, and within each group, the downlink communication and uplink communication are performed at different time bands. As one example, in FIG. 1, the three units of customer premises equipment 21-23 covered by base station equipment 11 are divided into Group A and Group B, so that the two units of customer premises equipment 22 and 23 are assigned to Group A and one unit of customer premises equipment 21 is assigned to Group B.

Here, various protocols can be used as the protocol for authenticating the customer premises equipment 21-26 present in service areas Q1-Q4 by the base station equipment 11-14.

As one example of such protocols, it is possible to use a constitution wherein: the base station equipment controls information regarding the customer premises equipment including information on groups, all customer premises equipment is first assumed to belong to a stipulated group (e.g., Group A) and booted up with respect to the base station equipment using a link control channel (LCCH(A)) for the group in question, and thereafter, in the event that booted-up customer premises equipment is found to belong to another group (e.g., Group B), then the base station equipment uses a broadcast control channel (BCCH(A)) for the stipulated group to direct the customer premises equipment to shift to the other group, thereby shifting the customer premises equipment to the other group.

In addition, as another example of the aforementioned protocol, it is possible to use a constitution wherein: information for the respective assigned group (e.g., Group A or Group B or the like) is given in advance to the various units of customer premises equipment, and each of the various units of customer premises equipment searches the broadcast control channel (BCCH) of the group assigned to it, and uses the link control channel (LCCH) of the assigned group to establish authentication with the base station equipment.

Note that with the aforementioned example of a protocol, for example, there is no need to provide a separate control frequency such as that in a constitution where a control frequency different from the communications frequency is provided and this control frequency is used to assign customer premises equipment to groups, so it is possible to improve the efficiency of utilization of frequencies. For example, in a subscriber wireless access system, the control channel typically with a frequency different from the channel used in communication is not provided.

With a subscriber wireless access system according to this preferred embodiment as described above, by performing wireless communication between the base station equipment 11-14 and the customer premises equipment 21-26 it covers, the following is possible. For example: customer premises equipment 21-23 covered by the same base station equipment 11 can be connected to each other for communication, customer premises equipment 21-26 covered by different base station equipment 11-14 can be connected to each other for communication, customer premises equipment 21-26 can be connected to the network 3 for communication, communications terminal units T1-T6 under the dominion of different customer premises equipment 21, 22 and 24 can be connected to each other for communication, and communications terminal units T1-T6 can be connected to the network 3 for communication.

Figure 2:
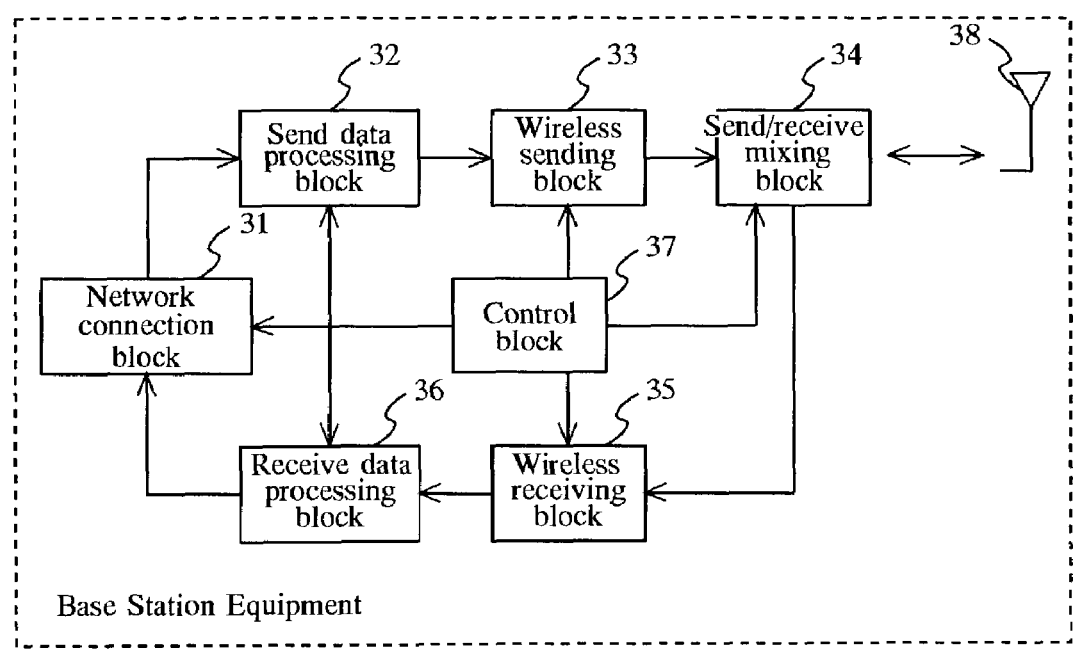
FIG. 2 is a diagram of an example of the constitution of base station equipment.

In addition, FIG. 2 shows an example of the constitution of the base station equipment 11-14. Note that in this preferred embodiment, the constitution and operation of the various units of base station equipment 11-14 are identical, so we shall describe their constitution and operation at the same time.

As shown in the figure, each unit of base station equipment 11-14 consists of: a network connection block 31, send data processing block 32, wireless sending block 33, send/receive mixing block 34, wireless receiving block 35, receive data processing block 36, control block 37 and antenna 38.

The network connection block 31 connects to a 10BASE-T, 100BASE-T or other Ethernet® or ATM leased line network and transmits data.

The send data processing block 32 takes data input from the network connection block 31 and converts it into a data format that matches the downlink communication frames for sending it to the customer premises equipment 21-26 under its dominion.

The wireless sending block 33 performs wireless modulation and up-conversion on the send data input from the send data processing block 32.

The send/receive mixing block 34 performs mixing so that sending on the send frequency and receiving on the receive frequency can be performed simultaneously, and outputs the send frequency from the wireless sending block 33 to the antenna 38, and also outputs the receive frequency from the antenna 38 to the wireless receiving block 35.

The antenna 38 sends the send frequency subject to sending as a wireless signal into space, and gets from space a signal sent wirelessly and takes it to be the receive frequency.

The wireless receiving block 35 performs down-conversion and wireless demodulation on the received frequency.

The receive data processing block 36 recognizes received data constituted upon the uplink communication frames received, disassembles it and outputs the received data thus obtained to the network connection block 31.

The control block 37 controls the various processes performed by the entire unit.

Figure 3:
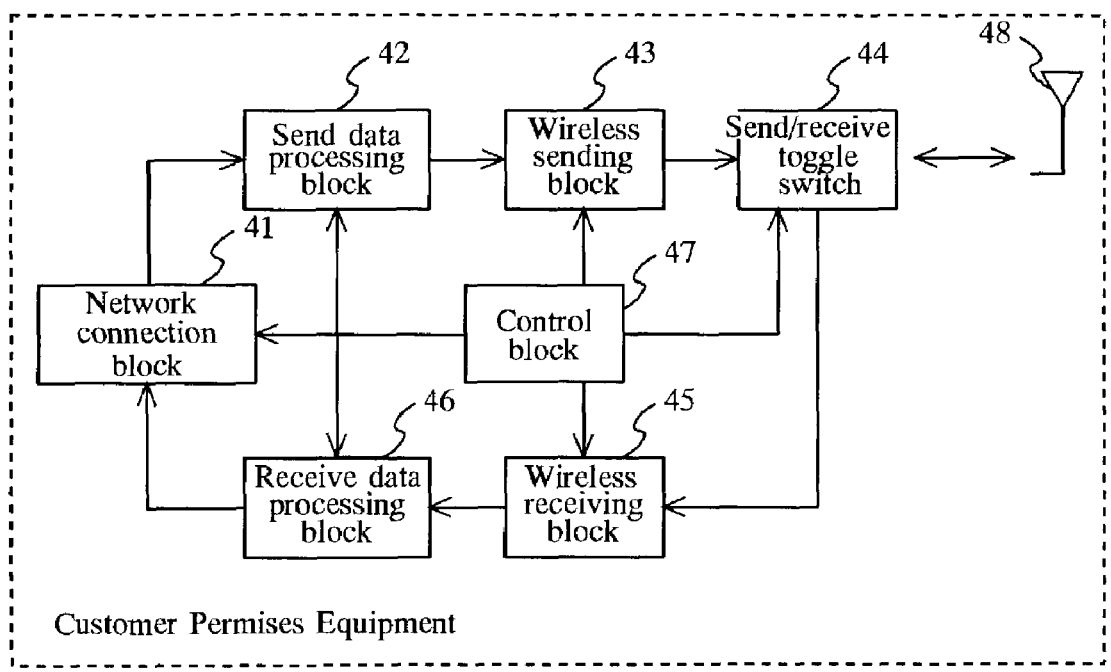
FIG. 3 is a diagram of an example of the constitution of customer premises equipment.
Figure 4:
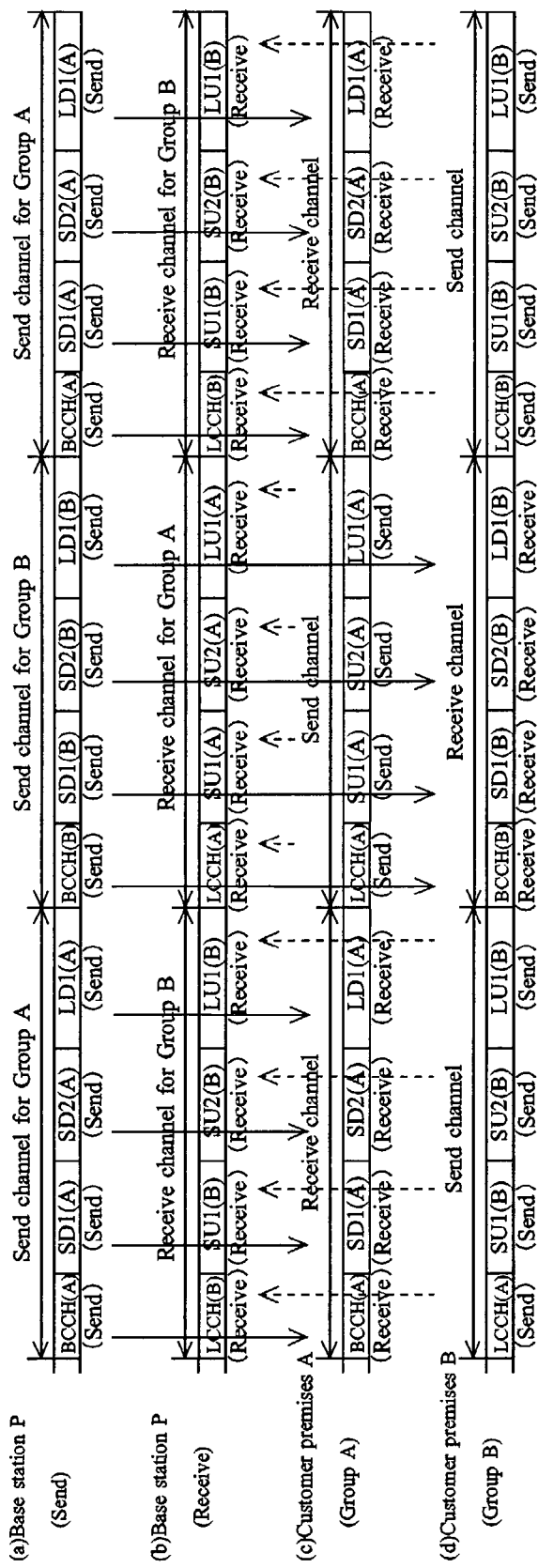
FIGS. 4(a)-4(d) are diagrams of an example of the constitution of a communication frame with a 2-group constitution.
Figure 5:
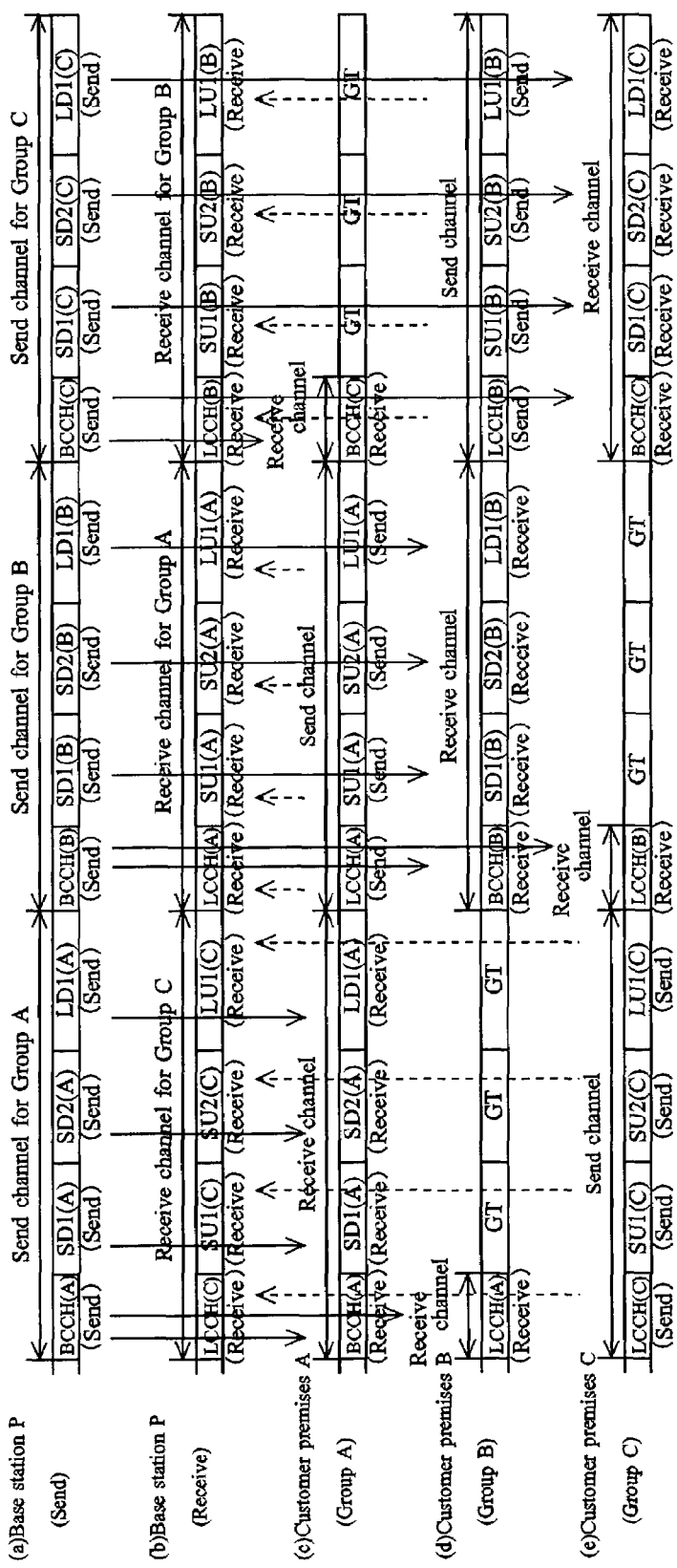
FIGS. 5(a)-5(e) are diagrams of an example of the constitution of a communication frame with a 3-group constitution.

In addition, FIG. 3 shows an example of the constitution of the customer premises equipment 21-26. Note that in this preferred embodiment, the constitution and operation of the various units of customer premises equipment 21-26 are identical, so we shall describe their constitution and operation at the same time.

As shown in the figure, each unit of base station equipment 11-14 consists of: a network connection block 41, send data processing block 42, wireless sending block 43, send/receive toggle switch 44, wireless receiving block 45, receive data processing block 46, control block 47 and antenna 48.

Here, the constitution and operation of the processing blocks 41-43 and 45-48 except for the send/receive toggle switch 44 are identical to those of the processing blocks 31-33 and 35-38 provided in base station equipment 11-14 as shown in FIG. 2 above.

In order to perform the sending of the send frequency and the receiving of the receive frequency at different timing, the send/receive toggle switch 44 toggles between the path of outputting the send frequency from the wireless sending block 43 to the antenna 48, and the path of outputting the receive frequency from the antenna 48 to the wireless receiving block 45. In this manner, in this preferred embodiment, while the base station equipment 11-14 performs send and receive communication simultaneously, the customer premises equipment 21-26 does not perform send and receive communication simultaneously, but rather sending and receiving are performed at different timing.

In this manner, the customer premises equipment 21-26 of this example is connected via Ethernet® or ATM or other wired networks to communications terminal units T1-T6, and with the customer premises equipment 21-26 of this example, the data sent from the communications terminal units T1-T6 is subjected to send data processing for conversion to a data format that matches the communication frames for sending to the base station equipment 11-14, and the send data thus generated is subjected to wireless modulation and up-conversion and then sent into space as the send frequency.

Moreover, the base station equipment 11-14 of this example receives this send frequency sent wirelessly from the customer premises equipment 21-26 that it covers, subjects the received frequency to down-conversion and wireless demodulation and then recognizes received data constituted upon the uplink communication frames thus received and disassembles it in the receive data processing, and sends and outputs the received data thus obtained to the Ethernet® or ATM or other wired network connected to the local station unit (base station equipment 11-14 in question).

In addition, in other base station equipment 11-14 connected to the aforementioned wired network which is the base station equipment 11-14 that covers under its dominion the communications terminal unit T1-T6 which is the destination of the aforementioned send data, the data that was sent and output via the aforementioned wired network is received and then the data is sent wirelessly to the customer premises equipment 21-26 that covers the communications terminal unit T1-T6 which is the destination of this data. Moreover, the customer premises equipment 21-26 in question receives this data and sends this data via a wired network to the communications terminal unit T1-T6 under its dominion that is the destination of this data.

Here, in this preferred embodiment, the subscriber wireless access system is equivalent to the wireless communications system referred to in the composition according to Example 1, while the base station equipment 11-14 is equivalent to the base station unit referred to in this composition, and the customer premises equipment 21-26 is equivalent to the communications station unit referred to in this composition.

Next, we shall describe the wireless communication performed by the wireless communications system according to preferred embodiment 1 of the constitution according to Example 1.

FIGS. 4(a)-4(d) show an example of the composition of a communication frame that can be used in wireless communication performed between the base station equipment 11-14 and customer premises equipment 21-26 in the wireless communications system in this example.

This example shows the case in which the customer premises equipment 21-26 covered under the domain of one unit of base station equipment 11-14 is divided into two groups, Group A and Group B, and in the following, for convenience in the description, we will describe an example of the case in which the base station unit P covers customer premises unit A and customer premises unit B, one customer premises unit A belongs to Group A and one customer premises unit B belongs to Group B.

Here, the "group" referred to in this example defines a set of customer premises units that perform downlink communication in the same time band and also perform uplink communication in the same time band. Moreover, in this example, a unit frame for downlink communication consists of one broadcast control channel (BCCH), two downlink-only short data channels (SD1, SD2) and one downlink-only long data channel (LD1). For each unit frame for downlink communication, the customer premises units belonging to the specific group assigned to each unit group perform downlink communication exclusively with these unit frames. Similarly, a unit frame for uplink communication consists of one link control channel (LCCH), two uplink-only short data channels (SU1, SU2) and one uplink-only long data channel (LU1). For each unit frame for uplink communication, the customer premises units belonging to the specific group assigned to each unit group perform uplink communication exclusively with these unit frames.

Figure 10:
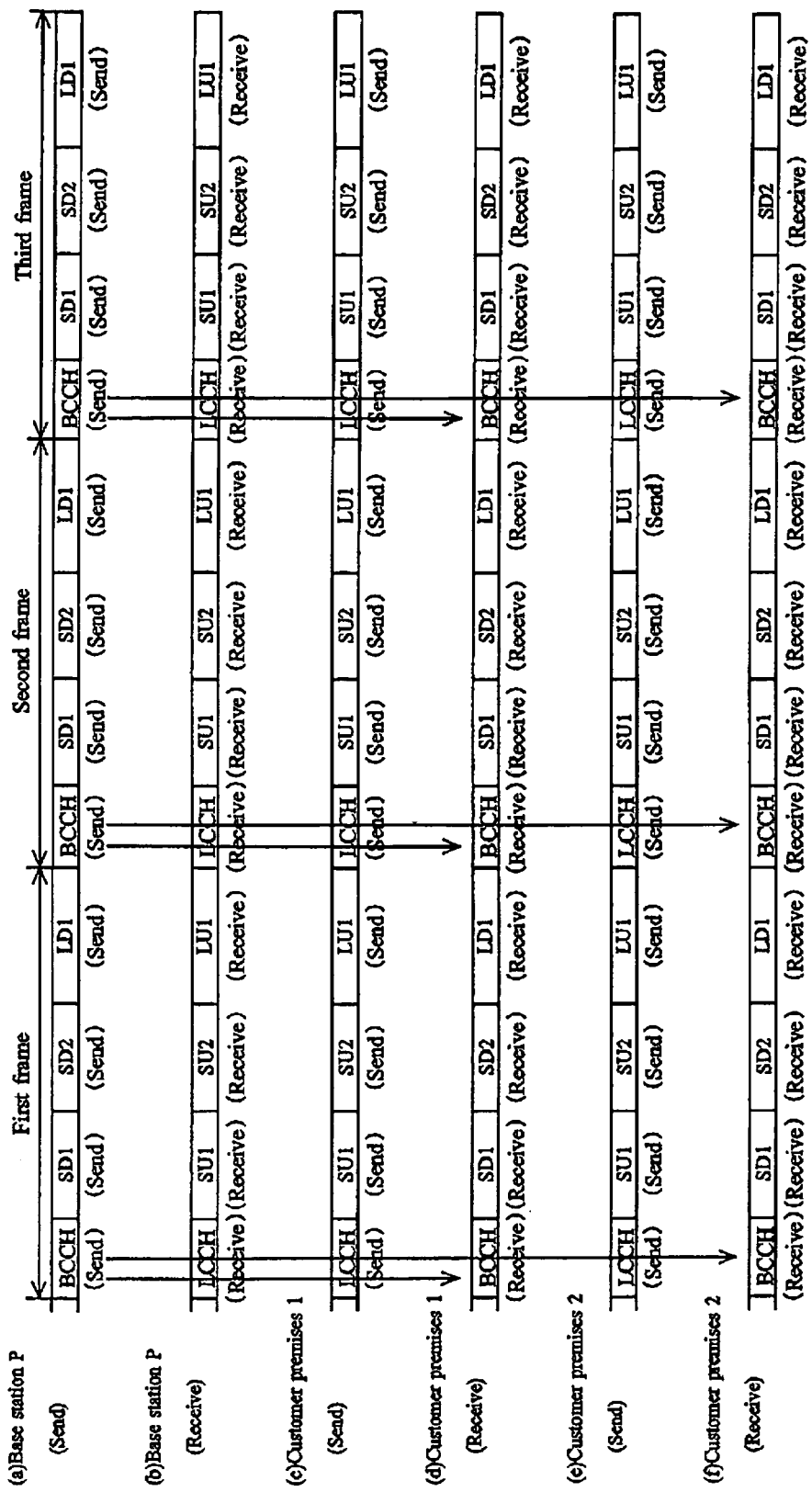
FIGS. 10(a)-10(f) are diagrams of an example of the constitution of a communication frame that does not have a group constitution according to the prior art.

Note that the BCCH, SD1, SD2, LD1, LCCH, SU1, SU2 and LU1 shown in this example have the same roles as in the communication frame shown in FIG. 10 above, but in this example, those used by Group A have "(A)" appended to the name of the channel while those used by Group B have "(B)" appended to the name of the channel.

In addition, in the same manner as the communication frame shown in FIG. 10 above, the base station unit P performs sending and receiving simultaneously for the communication frame of this example, but the communication frame of this example has the customer premises units A and B performing sending and receiving in different time bands.

Moreover, in this example, in the downlink communication frame, Group A and Group B are allocated alternately in a plurality of unit frames lined up consecutively. To wit, in the first frame, downlink communication is performed from the base station unit P to the customer premises unit A of Group A, in the second frame, downlink communication is performed from the base station unit P to the customer premises unit B of Group B, and in the third frame, downlink communication is performed from the base station unit P to the customer premises unit A of Group A, . . . , so the downlink communication of Group A and the downlink communication of Group B are performed alternately.

Similarly, in this example, in the uplink communication frame, Group A and Group B are allocated alternately in a plurality of unit frames lined up consecutively. To wit, in the first frame, uplink communication is performed from the customer premises unit B of Group B to the base station unit P, in the second frame, uplink communication is performed from the customer premises unit A of Group A to the base station unit P, and in the third frame, uplink communication is performed from the customer premises unit B of Group B to the base station unit P . . . , so the uplink communication of Group A and the uplink communication of Group B are performed alternately.

Specifically, as shown in FIG. 4(a), in downlink communication, the base station unit P performs sending to customer premises unit A of Group A in the order BCCH(A), SD1(A), SD2(A), LD1(A) in the first frame at the beginning. In addition, in this first frame, as shown in FIG. 4(b), in uplink communication, the base station unit P receives data (radio waves) from customer premises unit B of Group B in the order LCCH(B), SU1(B), SU2(B), LU1(B).

In addition, in the second frame, as shown in FIG. 4(a), in downlink communication, the base station unit P performs sending to customer premises unit B of Group B in the order BCCH(B), SD1(B), SD2(B), LD1(B). In addition, in this second frame, as shown in FIG. 4(b), in uplink communication, the base station unit P receives data (radio waves) from customer premises unit A of Group A in the order LCCH(A), SU1(A), SU2(A), LU1(A).

On the other hand, as shown in FIG. 4(c), the customer premises unit A of Group A performs receiving from base station unit P in the order BCCH(A), SD1(A), SD2(A), LD1(A) in the first frame at the beginning. In the second frame, an arbitrary customer premises unit A uses LCCH(A) to perform sending to the base station unit P, and the customer premises unit A permitted to send performs sending to the base station unit P in the order SU1(A), SU2(A), LU1(A).

In addition, as shown in FIG. 4(d), the customer premises unit B of Group B uses LCCH(B) to perform sending to base station unit P, and the customer premises unit B permitted to send performs sending to the base station unit P in the order SU1(B), SU2(B), LU1(B), and in the next second frame performs receiving from the base station unit P in the order BCCH(B), SD1(B), SD2(B), LD1(B).

In this manner, the base station unit P repeatedly performs communication combining sending to Group A and receiving from Group B, and communication combining sending to Group B and receiving from Group A, switching alternately between the two in each unit frame. In addition, synchronized to this, the customer premises unit A of Group A performs receiving from base station unit P and sending to base station unit P, switching between the two in each unit frame. In addition, synchronized to this, the customer premises unit B of Group B performs receiving from base station unit P and sending to base station unit P, switching between the two in each unit frame.

To wit, when the customer premises units A and B are to send certain data by uplink communication to base station unit P, first, the customer premises units A and B use LCCH to make a request to base station unit P for uplink communication, and in response to the base station unit P receiving this request by this LCCH, a determination is made as to whether or not there is empty space in the data send channels SU1, SU2 and LU usable by the customer premises units A and B. As a result, if it is determined that there is empty space, the BCCH is used to notify customer premises units A and B of the permission to send data (uplink communication) and the send data channel to be used. Then, in response to receive this permission by BCCH from the base station unit P, premises units A and B use the data send channel thus notified to send the data by uplink communication to the base station unit P.

In addition, when the base station unit P is to send certain data by downlink communication to customer premises units A and B, first, the base station unit P uses BCCH to notify customer premises units A and B of the presence of data to be sent to (or data to be received by) customer premises units A and B and the data send channels SD1, SD2 or LD to be used. Then, in response to the customer premises units A and B receiving this notification by BCCH from the base station unit P, premises units A and B use the data receive channel thus notified to receive the data by downlink communication from the base station unit P based on the content of this notice.

As described above, in the subscriber wireless access system wherein base station equipment 11-14 and customer premises equipment 21-26 perform wireless communication according to the communications protocol using communication frames having the group composition as in this example, the base station equipment 11-14 covers a plurality of units of customer premises equipment 21-26, and when downlink communication from the base station equipment 11-14 to the customer premises equipment 21-26 and uplink communication from the customer premises equipment 21-26 to the base station equipment 11-14 are performed wirelessly, a plurality of Groups A and B that perform receiving in the same time band and perform sending in the same time band is provided, and the customer premises equipment 21-26 covered by the base station equipment 11-14 is assigned to one of Groups A or B, and the communication time band is made different for downlink communication and uplink communication in Groups A and B, while the downlink communication and uplink communication between the base station equipment 11-14 and plurality of units of customer premises equipment 21-26 are performed by time-division multiplexing regarding the plurality of Groups A and B.

Accordingly, in the subscriber wireless access system of this example, because sending and receiving do not occur simultaneously in customer premises equipment 21-26, from a hardware standpoint, the sending and receiving blocks can be shared. Also, there is no need to provide a send/receive mixing block that permits sending and receiving to be performed simultaneously, but instead, a configuration using a send/receive toggle switch 44 can be used, so the cost of the customer premises equipment 21-26 can be reduced and it is possible to lower the power consumption.

In addition, when operating communications services, for example, by forming the groups as in this example and allocating them to the respective wireless bandwidths, it is possible to secure a specific wireless bandwidth easily for a specific user (customer premises unit).

In addition, with the communication frames of this example, looking at an arbitrary time band, one of the groups is always assigned to downlink communication and also another group is assigned to uplink communication, ensuring that the base station equipment can continuously perform downlink communication and uplink communication, so the entire communication frame can be used to achieve communication with no waste in comparison to the prior art. Note that modes that permit continuous communication naturally include modes that provide guard time or other empty communication time required in order to ensure error-free communication.

Here, in this example, the unit frames of downlink communication allocated in order for each group to perform downlink communication are equivalent to the downlink frames for performing downlink communication by each group in the composition according to Example 1, and the unit frames of uplink communication allocated in order for each group to perform uplink communication are equivalent to the uplink frames for performing uplink communication by each group in this composition. In addition, in the communication frames of this example, downlink communication frames and uplink communication frames for a plurality of groups are disposed so that downlink communication frames of the same group and uplink communication frames of the same group are disposed in different time bands.

In addition, in this example, looking at the downlink communication frames, the unit frames allocated to Groups A and B are arranged in a stipulated order (A, B, A, B, . . . ). To wit, the downlink communication between the base station unit P and customer premises units A and B is performed in time-division multiplexing regarding a plurality of Groups A and B.

Similarly, in this example, looking at the uplink communication frames, the unit frames allocated to Groups A and B are arranged in a stipulated order (B, A, B, A, . . . ). To wit, the uplink communication between the base station unit P and customer premises units A and B is performed in time-division multiplexing regarding a plurality of Groups A and B.

Next, we shall describe the wireless communication performed by the wireless communications system according to preferred embodiment 2 of the constitution according to Example 1.

FIGS. 5(a)-5(e) show an example of the composition of a communication frame that is used in wireless communication performed between the base station equipment 11-14 and customer premises equipment 21-26 in the wireless communications system in this example.

This example shows the case in which the customer premises equipment 21-26 covered under the domain of one unit of base station equipment 11-14 is divided into three groups, Group A, Group B and Group C, and in the following, for convenience in the description, we will describe an example of the case in which the base station unit P covers customer premises unit A and customer premises unit B, one customer premises unit A belongs to Group A, one customer premises unit B belongs to Group B and one customer premises unit C belongs to Group C.

Here, except for the fact that the customer premises equipment 21-26 is divided into three groups, the composition is identical to that of the communication frame shown in FIGS. 4(a)-4(d) above.

To wit, in this example, in the downlink communication frame, Group A, Group B and Group C are allocated alternately in a plurality of unit frames lined up consecutively. To wit, in the first frame, downlink communication is performed from the base station unit P to the customer premises unit A of Group A, in the second frame, downlink communication is performed from the base station unit P to the customer premises unit B of Group B, in the third frame, downlink communication is performed from the base station unit P to the customer premises unit C of Group C, and in the fourth frame, downlink communication is performed from the base station unit P to the customer premises unit A of Group A, . . . , so the downlink communication of Group A, the downlink communication of Group B and the downlink communication of Group C are performed alternately.

Similarly, in this example, in the uplink communication frame, Group A and Group B are allocated alternately in a plurality of unit frames lined up consecutively. To wit, in the first frame, uplink communication is performed from the customer premises unit C of Group C to the base station unit P, in the second frame, uplink communication is performed from the customer premises unit A of Group A to the base station unit P, in the third frame, uplink communication is performed from the customer premises unit B of Group B to the base station unit P, and in the fourth frame, uplink communication is performed from the customer premises unit C of Group C to the base station unit P, . . . , so the uplink communication of Group A, the uplink communication of Group B and the uplink communication of Group C are performed alternately.

Specifically, as shown in FIG. 5(a), in downlink communication, the base station unit P performs sending to customer premises unit A of Group A in the order BCCH(A), SD1(A), SD2(A), LD1(A) in the first frame at the beginning. In addition, in this first frame, as shown in FIG. 5(b), in uplink communication, the base station unit P receives data (radio waves) from customer premises unit C of Group C in the order LCCH(C), SU1(C), SU2(C), LU1(C).

In addition, in the second frame, as shown in FIG. 5(a), in downlink communication, the base station unit P performs sending to customer premises unit B of Group B in the order BCCH(B), SD1(B), SD2(B), LD1(B). In addition, in this second frame, as shown in FIG. 4(b), in uplink communication, the base station unit P receives data (radio waves) from customer premises unit A of Group A in the order LCCH(A), SU1(A), SU2(A), LU1(A).

In addition, in the third frame, as shown in FIG. 5(a), in downlink communication, the base station unit P performs sending to customer premises unit C of Group C in the order BCCH(C), SD1(C), SD2(C), LD1(C). In addition, in this second frame, as shown in FIG. 5(b), in uplink communication, the base station unit P receives data (radio waves) from customer premises unit B of Group B in the order LCCH(B), SU1(B), SU2(B), LU1(B).

On the other hand, as shown in FIG. 5(c), the customer premises unit A of Group A performs receiving from base station unit P in the order BCCH(A), SD1(A), SD2(A), LD1(A) in the first frame at the beginning. In the second frame, the customer premises unit A permitted to send performs sending to the base station unit P in the order SU1(A), SU2(A), LU1(A). In the third frame, only BCCH (C) is received in order to achieve synchronization with the base station unit P. Note that in customer premises units A-C, the time band in which no sending or receiving to or from base station unit P is performed may be handled as a time band similar to guard time (GT).

In addition, as shown in FIG. 5(d), in the first frame at the beginning, the customer premises unit B of Group B receives only BCCH(A) in order to achieve synchronization with the base station unit P. Next, in the second frame, receiving from the base station unit P is performed in the order BCCH(B), SD1(B), SD2(B), LD1(B). Next, in the third frame, the customer premises unit B permitted to send performs sending to the base station unit P in the order LCCH(B), SU1(B), SU2(B), LU1(B).

In addition, as shown in FIG. 5(e), in the first frame at the beginning, in the customer premises unit C of Group C, the customer premises unit C permitted to send performs sending to the base station unit P in the order LCCH(C), SU1(C), SU2(C), LU1(C). Next, in the second frame, receiving of BCCH(B) only is performed in order to achieve synchronization with the base station unit P. Next, in the third frame, receiving from the base station unit P is performed in the order BCCH(C), SD1(C), SD2(C), LD1(C).

In this manner, the base station unit P repeatedly performs communication combining sending to Group A and receiving from Group C, communication combining sending to Group B and receiving from Group A, and communication combining sending to Group C and receiving from Group B, switching among them in each unit frame. In addition, synchronized to this, the customer premises unit A of Group A performs receiving from base station unit P, sending to base station unit P, and standing by (pause), switching among them in each unit frame. In addition, synchronized to this, the customer premises unit B of Group B performs standing by, receiving from base station unit P and sending to base station unit P, switching among them in each unit frame. In addition, synchronized to this, the customer premises unit C of Group C performs sending to base station unit P, standing by and receiving from base station unit P, switching among them in each unit frame.

As described above, even in a subscriber wireless communications system wherein wireless communication is performed between the base station equipment 11-14 and customer premises equipment 21-26 according to a communications protocol using communication frames as in this example, the same advantages can be obtained as described in preferred embodiment 1 according to Example 1.

Next, we shall describe the wireless communication performed by the wireless communications system according to preferred embodiment 3 of the constitution according to Example 1.

FIGS. 6(a)-6(f) show an example of the composition of a communication frame that is used in wireless communication performed between the base station equipment 11-14 and customer premises equipment 21-26 in the wireless communications system in this example.

This example shows the case in which the customer premises equipment 21-26 covered under the domain of one unit of base station equipment 11-14 is divided into four groups, Group 1, Group 2, Group 3 and Group 4, and in the following, for convenience in the description, we will describe an example of the case in which the base station unit P covers customer premises unit A and customer premises unit B, one customer premises unit A belongs to Group 1, one customer premises unit B belongs to Group 2, one customer premises unit C belongs to Group 3, and one customer premises unit D belongs to Group 4.

Here, the "group" referred to in this example defines a set of customer premises units that perform downlink communication in the same time band and also perform uplink communication in the same time band.

As shown in FIG. 6(a), the downlink communication frames according to this example consist of a plurality of the unit frames, the "first frame," "second frame," "third frame" . . . , each of which consists of a broadcast control channel block (BCCH block) containing four broadcast channels (BCCH1-BCCH4), a downlink-only short channel block (SD block) containing four downlink-only short data channels (SD1-SD4) and a downlink-only long data channel block (LD block) containing four downlink-only long data channels (LD1-LD4).

In addition, the BCCH block consists of BCCH1 allocated to Group 1, BCCH2 allocated to Group 2, BCCH3 allocated to Group 3 and BCCH4 allocated to Group 4, disposed in this order. Similarly, the SD block consists of SD1 allocated to Group 1, SD2 allocated to Group 2, SD3 allocated to Group 3 and SD4 allocated to Group 4, disposed in this order. Similarly, the LD block consists of LD1 allocated to Group 1, LD2 allocated to Group 2, LD3 allocated to Group 3 and LD4 allocated to Group 4, disposed in this order.

In addition, as shown in FIG. 6(b), the uplink communication frames according to this example consist of a plurality of the unit frames, the "first frame," "second frame," "third frame" . . . , each of which consists of a link control channel block (LCCH block) containing four link control channels (LCCH1-LCCH4), an uplink-only short channel block (SU block) containing four uplink-only short data channels (SU1-SU4) and an uplink-only long data channel block (LU block) containing four uplink-only long data channels (LU1-LU4).

In addition, the LCCH block consists of LCCH1 allocated to Group 1, LCCH2 allocated to Group 2, LCCH3 allocated to Group 3 and LCCH4 allocated to Group 4, disposed in this order. Similarly, the SU block consists of SU1 allocated to Group 1, SU2 allocated to Group 2, SU3 allocated to Group 3 and SU4 allocated to Group 4, disposed in this order. Similarly, the LU block consists of LU1 allocated to Group 1, LU2 allocated to Group 2, LU3 allocated to Group 3 and LU4 allocated to Group 4, disposed in this order.

In addition, the downlink communication frame shown in FIG. 6(a) and the uplink communication frame shown in FIG. 6(b) are, as shown in FIGS. 6(a) and (b), constituted such that in each of the unit frames, the "first frame," "second frame," "third frame" . . . , both of the unit frames are disposed in the same time band. In addition, in each unit frame, the BCCH block and LCCH block are disposed in the same time band, the SD block and SU block are disposed in the same time band, and the LD block and LU block are disposed in the same time band. In addition, in each of the combination of the BCCH block and LCCH block, the combination of the SD block and SU block and the combination of the LD block and LU block, the four channels 1, 2, 3, 4 for performing downlink communication are each disposed in the same time band as the four channels 3, 4, 1, 2 for performing uplink communication, respectively.

Figure 11:
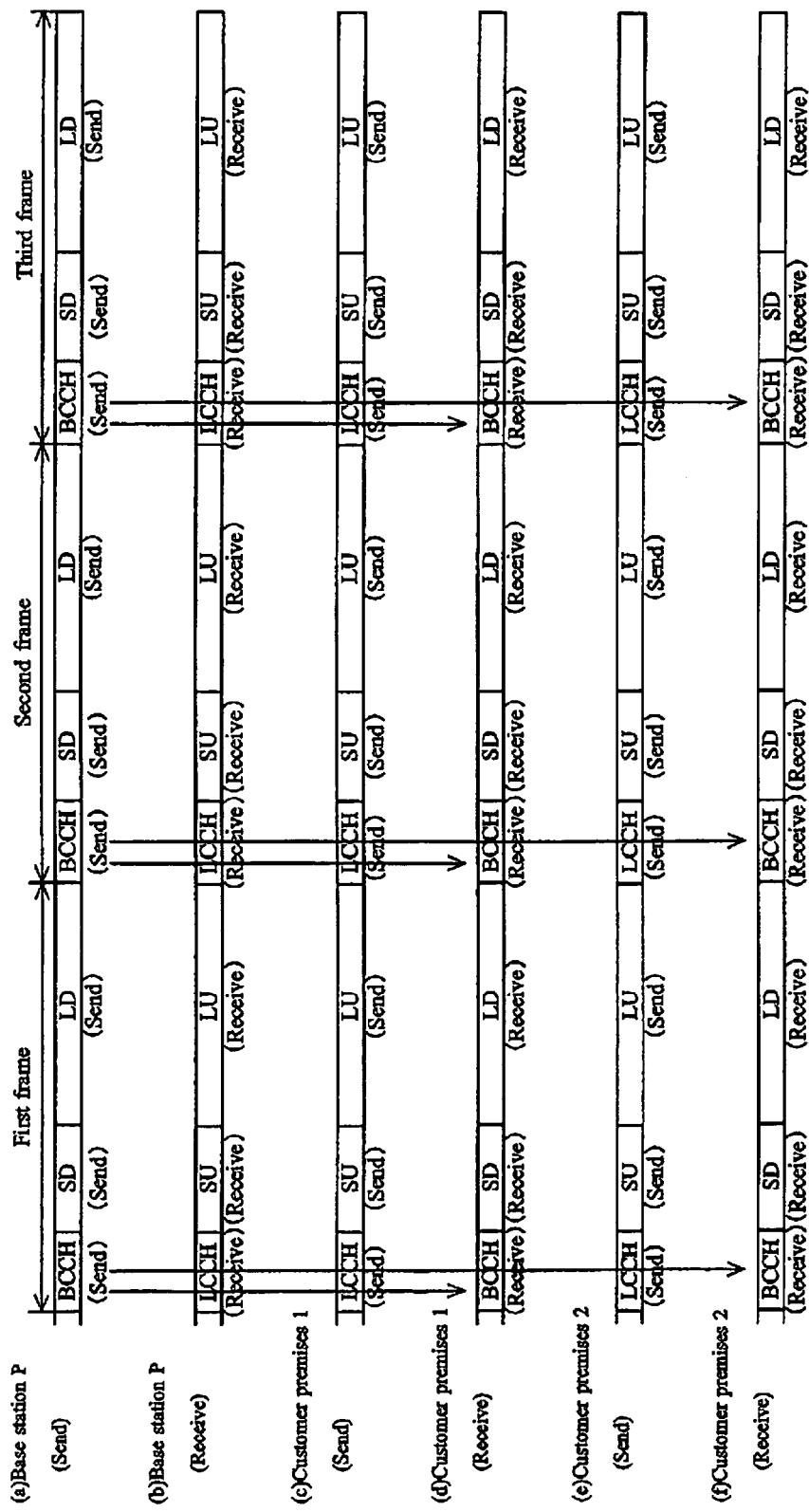
FIGS. 11(a)-11(f) are diagrams of another example of the constitution of a communication frame that does not have a group constitution according to the prior art.

Note that the BCCH block (BCCH1-BCCH4), SD block (SD1-SD4), LD block (LD1-LD4), LCCH block (LCCH1-LCCH4), SU block (SU1-SU4) and LU block (LU1-LU4) each have a role similar to that described in the communication frame shown in FIG. 11. In this example, "1" is appended to the names of channels used by Group 1, "2" is appended to the names of channels used by Group 2, "3" is appended to the names of channels used by Group 3 and "4" is appended to the names of channels used by Group 4.

In addition, in the same manner as in the communication frame shown in FIG. 11, with the communication frame according to this example, the base station unit P performs sending and receiving simultaneously, but in the communication frame of this example, the customer premises units A-D each perform sending and receiving in different time bands.

Specifically, as shown in FIG. 6(a), in downlink communication, the base station unit P, in the BCCH block at the beginning, performs sending to customer premises unit A of Group 1, customer premises unit B of Group 2, customer premises unit C of Group 3 and customer premises unit D of Group 4 in the order BCCH1, BCCH2, BCCH3, BCCH4. In addition, in the same time band, as shown in FIG. 6(b), in uplink communication, the base station unit P, in the LCCH block at the beginning, performs the receiving of data (radio waves) from customer premises unit C of Group 3, customer premises unit D of Group 4, customer premises unit A of Group 1 and customer premises unit B of Group 2, in the order BCCH3, BCCH4, BCCH1, BCCH2.

Figure 6:
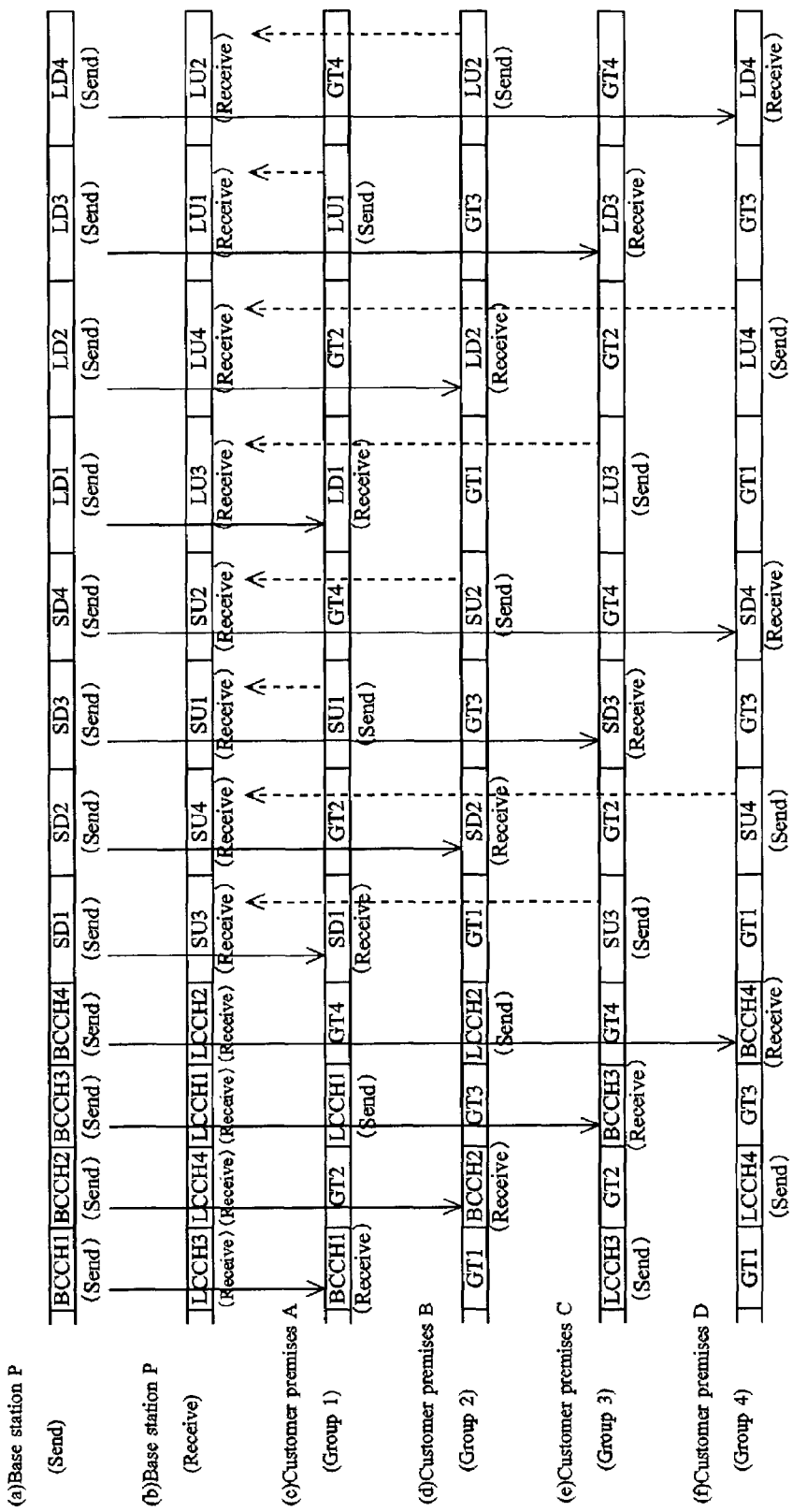
FIGS. 6(a)-6(f) are diagrams of an example of the constitution of a communication frame with a 4-group constitution.

In addition, as shown in FIG. 6(a), in downlink communication, the base station unit P, in the next SD block, performs sending to customer premises unit A of Group 1, customer premises unit B of Group 2, customer premises unit C of Group 3 and customer premises unit D of Group 4 in the order SD1, SD2, SD3, SD4. In addition, in the same time band, as shown in FIG. 6(*b*), in uplink communication, the base station unit P, in the SU block, performs the receiving of data (radio waves) from customer premises unit C of Group 3, customer premises unit D of Group 4, customer premises unit A of Group 1 and customer premises unit B of Group 2, in the order SU3, SU4, SU1, SU2.

In addition, as shown in FIG. 6(*a*), in downlink communication, the base station unit P, in the next LD block, performs sending to customer premises unit A of Group 1, customer premises unit B of Group 2, customer premises unit C of Group 3 and customer premises unit D of Group 4 in the order LD1, LD2, LD3, LD4. In addition, in the same time band, as shown in FIG. 6(*b*), in uplink communication, the base station unit P, in the LU block, performs the receiving of data (radio waves) from customer premises unit C of Group 3, customer premises unit D of Group 4, customer premises unit A of Group 1 and customer premises unit B of Group 2, in the order LU3, LU4, LU1, LU2.

On the other hand, as shown in FIG. 6(*c*), in the customer premises unit A of Group 1, receiving is performed on the first BCCH1 in the BCCH block and LCCH block at the beginning, no sending or receiving is performed in the next channel, sending is performed on the next channel LCCH1 and no sending or receiving is performed in the next channel. Similarly, in the customer premises unit A of Group 1, the switching among receive, pause, send, pause is performed repeatedly in the SD block, SU block, LD block and LU block. Note that in customer premises units A-D, the time band in which no sending or receiving to or from base station unit P is performed may be handled as a time band similar to guard time (GT).

Similarly, as shown in FIG. 6(*d*), in the customer premises unit B of Group 2, the switching among pause, receive, pause, send, is performed repeatedly in each channel of each channel block.

Similarly, as shown in FIG. 6(*e*), in the customer premises unit C of Group 3, the switching among send, pause, receive, pause, is performed repeatedly in each channel of each channel block.

Similarly, as shown in FIG. 6(*f*), in the customer premises unit D of Group 4, the switching among pause, send, pause, receive, is performed repeatedly in each channel of each channel block.

As described above, in the subscriber wireless access system wherein base station equipment 11-14 and customer premises equipment 21-26 perform wireless communication according to the communications protocol using communication frames having the group composition as in this example, the base station equipment 11-14 covers a plurality of units of customer premises equipment 21-26, and when downlink communication from the base station equipment 11-14 to the customer premises equipment 21-26 and uplink communication from the customer premises equipment 21-26 to the base station equipment 11-14 are performed wirelessly, a plurality of Groups 1-4 that perform receiving in the same time band and perform sending in the same time band is provided, and the customer premises equipment 21-26 covered by the base station equipment 11-14 is assigned to one of Groups 1-4, and the communication time band is made different for downlink communication and uplink communication in Groups 1-4, while the downlink communication and uplink communication between the base station equipment 11-14 and plurality of units of customer premises equipment 21-26 is performed by time-division multiplexing regarding the plurality of Groups 1-4.

Accordingly, in the subscriber wireless access system of this example, because sending and receiving do not occur simultaneously in customer premises equipment 21-26, from a hardware standpoint, the sending and receiving blocks can be shared. Also, there is no need to provide a send/receive mixing block that permits sending and receiving to be performed simultaneously, but instead, a configuration using a send/receive toggle switch 44 can be used, so the cost of the customer premises equipment 21-26 can be reduced and it is possible to lower the power consumption.

In addition, when operating communications services, for example, by forming the groups as in this example and allocating them to the respective wireless bandwidths, it is possible to secure a specific wireless bandwidth easily for a specific user (customer premises unit).

In addition, with the communication frames of this example, looking at an arbitrary time band, one of the groups is always assigned to downlink communication and also another group is assigned to uplink communication, ensuring that the base station equipment can continuously perform downlink communication and uplink communication, so the entire communication frame can be used to achieve communication with no waste in comparison to the prior art. Note that modes that permit continuous communication naturally include modes that provide guard time or other empty communication time required in order to ensure error-free communication.

In addition, in the subscriber wireless access system of this example, the communication time band of another group is provided between the downlink communication time band and uplink communication time band of each of Groups 1-4.

Accordingly, at the time of switching from sending to receiving in each unit of customer premises equipment 21-26, a time band on which no sending or receiving is performed (a pause channel) is always inserted, so such a time band can be utilized as guard time, so the time band for the guard time conventionally provided between channels that perform sending and channels that perform receiving can be much shorter than in the prior art.

To wit, in this example, the delay time for wireless propagation due to the distance between the base station equipment 11-14 and customer premises equipment 21-26 can be absorbed using the time band for the pause channels provided before and after the sending and receiving time bands of the customer premises equipment 21-26. Specifically, in customer premises equipment 21-26 located far away from base station equipment 11-14, depending on the distance from the base station equipment 11-14, sending over the send channels can cover not only the time band for this send channel, but a portion of the time band of the pause channel positioned immediately before this send channel can be utilized, so it can start when touching this portion. In addition, in customer premises equipment 21-26 located far away from base station equipment 11-14, depending on the distance from the base station equipment 11-14, receiving over the receive channels can cover not only the time band for this receive channel, but a portion of the time band of the pause channel positioned immediately after this receive channel can be utilized, so it can extend even to when touching this portion.

With a composition wherein wireless communication is performed utilizing a pause channel between the send and receive channels of the customer premises equipment 21-26, the guard time provided between the send channels and receive channels can be made shorter than that in the prior art, and thus the efficiency of utilization of the wireless bandwidth in data communication can be increased by as much as the guard time is shortened.

As described above, in the wireless communications system or station units (base station units or communications station units) according to Example 1, the base station units cover a plurality of communications station units, and when downlink communication from the base station units to the communications station units and uplink communication from the communications station units to the base station units are performed wirelessly, a plurality of groups that perform receiving in the same time band and perform sending in the same time band is provided, and each of the communications station units covered by the base station units is assigned to one of the groups, and the communication time band is made different for downlink communication and uplink communication in each of the groups, while the downlink communication and uplink communication between the base station units and plurality of communications station units is performed by time-division multiplexing regarding the plurality of groups, so the receiving and sending by the communications station units are performed in different time bands, and thus in comparison to the prior art, it is possible to achieve a less expensive communications station unit with lower power consumption that can be used as customer premises equipment or the like.

Here follows a detailed description of a preferred embodiment of the wireless communications system according to Example 2.

Note that in this wireless communications system, one preferred embodiment is implemented by means of the wireless communications system, base station equipment and customer premises equipment illustrated in preferred embodiment 3 of the constitution according to Example 1.

We shall first present the object of the constitution according to Example 2. Note that this constitution has the same object as the constitution according to Example 1.

To wit, in wireless communication, the base station unit typically forms a communication coverage area (service area) of a stipulated size and performs wireless communication with the communications station units present within this communication coverage area, but in order to absorb the delay time in wireless propagation between the base station unit and communications station units, depending on the distance between the base station unit and communications station unit, guard time (GT) must be provided between the downlink communication channel to the communications station unit and the uplink communication channel from this communications station unit, so there is a problem in that this guard time makes communication inefficient.

Note that guard time is inserted between the time band in which the communications station unit performs receiving and the time band in which sending is performed in order to prevent the overlapping of this sending and this receiving at the same time. To wit, even in the event that a certain amount of delay occurs in the communications timing between the communications station unit and base station unit, it is possible to perform receiving or sending using a portion of the guard time, which is supposed to be a time band in which no communication is performed, and thus prevent the overlapping of the receiving time band and sending time band.

In the constitution according to Example 1, with a wireless communications system that performs wireless communication between a base station unit and plurality of communications station units and such a base station unit and communications station unit, the intent is to provide a wireless communications system wherein the receive time band and send time band of the communications station unit are made different and a base station unit and communications station unit. In addition, by having the communications station unit used as the customer premises equipment or the like perform sending and receiving simultaneously, it is possible to solve the typical problems in P-MP wireless communications systems of high cost and high power consumption, thereby achieving an inexpensive communications station unit with low power consumption and also improving the efficiency of wireless communication by shortening the guard time.

Specifically, in the wireless communications system according to Example 2, as described below, a base station unit covers a plurality of communications station units, and the downlink communication from the base station unit to communications station unit and the uplink communication from the communications station unit to base station unit are performed wirelessly.

To wit, a plurality of four or more groups are provided to perform reception on the same time band and perform sending on the same time band (to wit, they perform sending and receiving on the same time band), and each of the communications station units covered by the base station unit is assigned to one of the groups, so that the communication time band of each group is made different for the downlink communication and uplink communication, and wireless communication is performed with a constitution wherein the downlink communication and uplink communication of the base station unit and plurality of communications station units is performed with time-division multiplexing regarding a plurality of groups for each.

Accordingly, by providing a plurality of four or more groups to perform reception (downlink communication) on the same time band and perform sending (uplink communication) on the same time band, and assigning each of the communications station units covered by the base station unit to one of the groups, so that the communication time band of each group is made different for the downlink communication and uplink communication, and moreover, communications time bands of other groups are provided between the downlink communication time bands and uplink communication time bands of each group, so by providing the receiving time band and sending time band of the communications station unit in different time bands and providing the communication time bands for other communications station units between said receiving time band and said sending time band, in comparison to the prior art, it is possible to achieve a less expensive communications station unit with lower power consumption that can be used as customer premises equipment or the like.

In addition, the downlink communication and uplink communication between a base station unit and plurality of communications station unit are performed by time-division multiplexing regarding a plurality of groups, so in the base station unit for example, it is possible to perform downlink communication and uplink communication continuously, and thus the efficiency of wireless communications can be secured.

In this manner, communications station units assigned to the same group perform downlink communication in the same time band set for that group, and also perform uplink communication in the same time band set for that group. In addition, the time band for downlink communication is different for each group and also the time band for uplink communication is different for each group. In addition, the time band for downlink communication and the time band for uplink communication are different in the same group, and the communication time bands for other groups are provided between the downlink communication time band and the uplink communication time band.

Here, different numbers can be used as the number of the plurality of communications station units covered by the base station unit, and this number may be set in a fixed manner or it can be varied dynamically depending on the traffic situation or the like. In addition, the communications station units covered by the base station unit may be set in a fixed manner or can be varied dynamically depending on the movement of communications station units or the like.

In addition, the communications station unit may be a unit that is installed in a fixed manner or a mobile unit.

Note that in the base station unit, all of the communications station units present in range of the base station unit in question, or that portion required for communication, are authenticated as other parties in communication, and wireless communication is performed by covering the authenticated communications station units as other parties in communication.

In addition, as the mode of assigning the various communications station units covered by the base station unit to one of the groups, a mode of fixed assignment in advance may be used, or a mode of dynamic assignment depending on the traffic situation or the like may also be used.

In addition, various numbers may be used as the number of the plurality of four or more groups.

In addition, there is no particular limit to the number of communications station units assigned to one group, as this may be one or a plurality. Note that at least a plurality of communications station units is assigned to one group.

In addition, various modes can be used as the mode whereby the communication time bands for other groups are provided between said downlink communication time band and said uplink communication time band, and communication is performed by time-division multiplexing regarding a plurality of groups in downlink communication and uplink communication, respectively, between the base station unit and the plurality of communications station units. Note that in the constitution according to Example 2, if the receiving time band and sending time band of the communications station unit are different, this also includes a mode wherein information for allowing the communications station units belonging to a certain group to be synchronized to the base station unit is received on the communications time band of another group.

In addition, the station units according to Example 1 may be used as the base station unit or communications station unit in a wireless communications system wherein: a base station unit covers a plurality of communications station units and downlink communication from the base station unit to the communications station unit and uplink communication from the communications station unit to the base station unit are performed wirelessly, and wireless communication is performed as follows.

To wit, a plurality of four or more groups are provided to perform reception on the same time band and perform sending on the same time band (to wit, they perform sending and receiving on the same time band), and each of the communications station units covered by the base station unit is assigned to one of the groups, so communication time bands for other groups are provided between the downlink communication time band and the uplink communication time band, and communication is performed by time-division multiplexing regarding a plurality of groups in downlink communication and uplink communication, respec- tively, between the base station unit and the plurality of communications station units.

Accordingly, in the same manner as in the above, it is possible to achieve a communications station unit that is less expensive and has lower power consumption than in the prior art, and also the guard time is shortened to improve the efficiency of wireless communications.

Note that the station unit according to Example 2 may be used as the base station unit, or it may be used as the communications station unit.

In addition, with the station unit according to Example 2, as an example, the downlink communication of each group is performed using a combination of a plurality of downlink traffic channels, and wireless communication may be performed by means of the following communication frames.

To wit, wireless communication is performed by means of a communication frame such that the traffic channels of other groups are disposed between the downlink channel and uplink channel of the same group, where, for every downlink traffic channel, a downlink traffic channel block with the downlink traffic channel of each group is disposed for a plurality of groups, and also, for every uplink traffic channel, an uplink traffic channel block with the uplink traffic channel of each group is disposed for a plurality of groups.

Accordingly, by performing wireless communication using such communication frames, it is possible to achieve a mode wherein sending and receiving by a communications station unit are performed in different time bands and communications time bands for other communications station units are provided between the time band for receiving and the time band for sending, and thus as described above, it is possible to achieve a communications station unit that is less expensive and has lower power consumption than in the prior art and also the guard time is shortened to improve the efficiency of wireless communications.

Note that various modes are possible as the mode wherein traffic channels of other groups are disposed between the downlink channel and uplink channel of the same group.

Here, in preferred embodiment 3 of the constitution according to the aforementioned Example 1, the downlink communication of Groups 1-4 is performed using a combination of a plurality of downlink traffic channels named BCCH1-4, SD1-4 and LD1-4, and the uplink communication of Groups 1-4 is performed using a combination of a plurality of uplink traffic channels named LCCH1-4, SU1-4 and LU1-4.

In addition, in preferred embodiment 3 of the constitution according to the aforementioned Example 1, the BCCH block, SD block and LD block with the downlink traffic channels 1, 2, 3, 4 for Groups 1, 2, 3, 4 disposed for every downlink traffic channel (BCCH, SD, LD) are equivalent to the traffic channel blocks of the constitution according to Example 2, while the LCCH block, SU block and LU block with the uplink traffic channels 3, 4, 1, 2 for Groups 3, 4, 1, 2 disposed for every uplink traffic channel (LCCH, SU, LU) are equivalent to the traffic channel blocks of the constitution according to Example 2. Moreover, in the communication frame of preferred embodiment 3 of the constitution according to the aforementioned Example 1, the downlink traffic channel blocks (BCCH block, SD block, LD block) are provided for a plurality of downlink traffic channels (BCCH, SD, LD), and also, the uplink traffic channel blocks (LCCH block, SU block, LU block) are provided for a plurality of uplink traffic channels (LCCH, SU, LU), and the composition is such that the traffic channels of other groups are disposed between the downlink traffic channel and uplink traffic channel of the same group.

In addition, in preferred embodiment 3 of the constitution according to the aforementioned Example 1, upon looking at each downlink traffic channel block, the downlink traffic channels assigned to each of Groups 1-4 are lined up in a stipulated order (1, 2, 3, 4, 1, 2, 3, 4, . . . ). To wit, downlink communication between the base station unit P and a plurality of customer premises units A-D is performed by time-division multiplexing regarding Groups 1-4.

Similarly, in preferred embodiment 3 of the constitution according to the aforementioned Example 1, upon looking at each uplink traffic channel block, the uplink traffic channels assigned to each of Groups 1-4 are lined up in a stipulated order (3, 4, 1, 2, 3, 4, 1, 2, . . . ). To wit, uplink communication between the base station unit P and a plurality of customer premises units A-D is performed by time-division multiplexing regarding Groups 1-4.

Note that in preferred embodiment 3 of the constitution according to the aforementioned Example 1, the case of dividing the plurality of units of customer premises equipment covered by one unit of base station equipment into four groups is illustrated, but a communication frame based on the same principle can also be composed for the case of five or more groups. As one example, in the case of five groups, the base station equipment may perform sending on each traffic channel block in the order Group 1, Group 2, Group 3, Group 4, Group 5, and also, receiving in the same time band as this may be performed in the order Group 3, Group 4, Group 5, Group 1, Group 2, or it may be performed in the order Group 4, Group 5, Group 1, Group 2, Group 3, and thus it is possible to provide the communications time band for other customer premises equipment between the receiving time band and sending time band of each customer premises equipment.

As described above, in the wireless communications system or station units (base station units or communications station units) according to Example 1, the base station units cover a plurality of communications station units, and when downlink communication from the base station units to the communications station units and uplink communication from the communications station units to the base station units are performed wirelessly, a plurality of four or more groups that perform receiving in the same time band and perform sending in the same time band is provided, and each of the communications station units covered by the base station units is assigned to one of the groups, and so communication time bands for other groups are provided between the downlink communication time band and the uplink communication time band, and communication is performed by time-division multiplexing regarding a plurality of groups in downlink communication and uplink communication, respectively, between the base station unit and the plurality of communications station units, and thus in comparison to the prior art, it is possible to achieve a less expensive communications station unit with lower power consumption that can be used as customer premises equipment or the like and also the guard time is shortened to improve the efficiency of wireless communications.

First, here follows a description of first mode of the invention.

Here follows a description of a preferred embodiment of the control of group assignment and the like in the subscriber wireless access system as shown in FIG. 1 through FIG. 6(*f*) above.

In the wireless communications system of this example, the base station equipment and various customer premises equipment are provided with functions for performing the control of group allocation.

Specifically, the base station equipment of this example is provided with: a function for detecting the usage situation of the send channels and receive channels of each of the units of customer premises equipment covered by this base station equipment, a function for assigning groups depending on the results of this detection and reconfiguring the customer premises equipment assigned to the various groups, and a function for directing the customer premises equipment to shift to new groups after every update period (group composition update time period) for periodically performing this reconfiguration (group assignment). In addition, each unit of customer premises equipment is provided with a function for changing the group to which the local station unit (that unit of customer premises equipment) belongs according to the directions from the base station equipment.

Here, in this example, the way for the base station unit to detect the usage situation of the send channels of the customer premises equipment used is a way of detecting the number of times LCCH had been received (to wit, the number of times that a data send request is received) from the various units of customer premises equipment during the group composition update time period as the usage situation.

In addition, in this example, the way for the base station unit to detect the usage situation of the receive channels of the customer premises equipment used is a way of detecting the total count of the SD (SD1, SD2) and LD channels sent (to wit, the total number of times that data sending was performed) to the various units of customer premises equipment during the group composition update time period as the usage situation.

In addition, the way for the base station unit to direct the customer premises equipment to shift groups every group composition update time period used is a way of using BCCH to notify the various customer premises equipment of content of these directions.

In addition, in this example, the way for each unit of customer premises equipment to change the group to which the local station unit (that unit of customer premises equipment) belongs according to the directions notified from the base station equipment used is a way wherein: when each unit of customer premises equipment receives the content of these directions from the base station equipment on the BCCH, all of the frames used in wireless communication with the base station equipment are taken to be receive frames and BCCH is received on all of these frames, and each unit searches through this received BCCH for a BCCH corresponding to the directed group as the one to which the local station unit is assigned, determines the send frames and receive frames used in the communication of the group to which the local station unit is assigned as the channel to be received by the local station unit, and performs subsequent send and receive operations using the send frames and receive frames thus determined.

Note that in this example, information sent from the base station equipment on each BCCH contains information that indicates the group corresponding to each BCCH, and by each unit of customer premises equipment searching for the BCCH containing information that indicates the group to which the local station unit is assigned, the aforementioned send and receive operations are performed by taking the BCCH thus found as the BCCH corresponding to the group to which the local station unit is assigned.

Here follows an example of the operation of group assignment performed by means of the base station equipment of this example.

Figure 7:
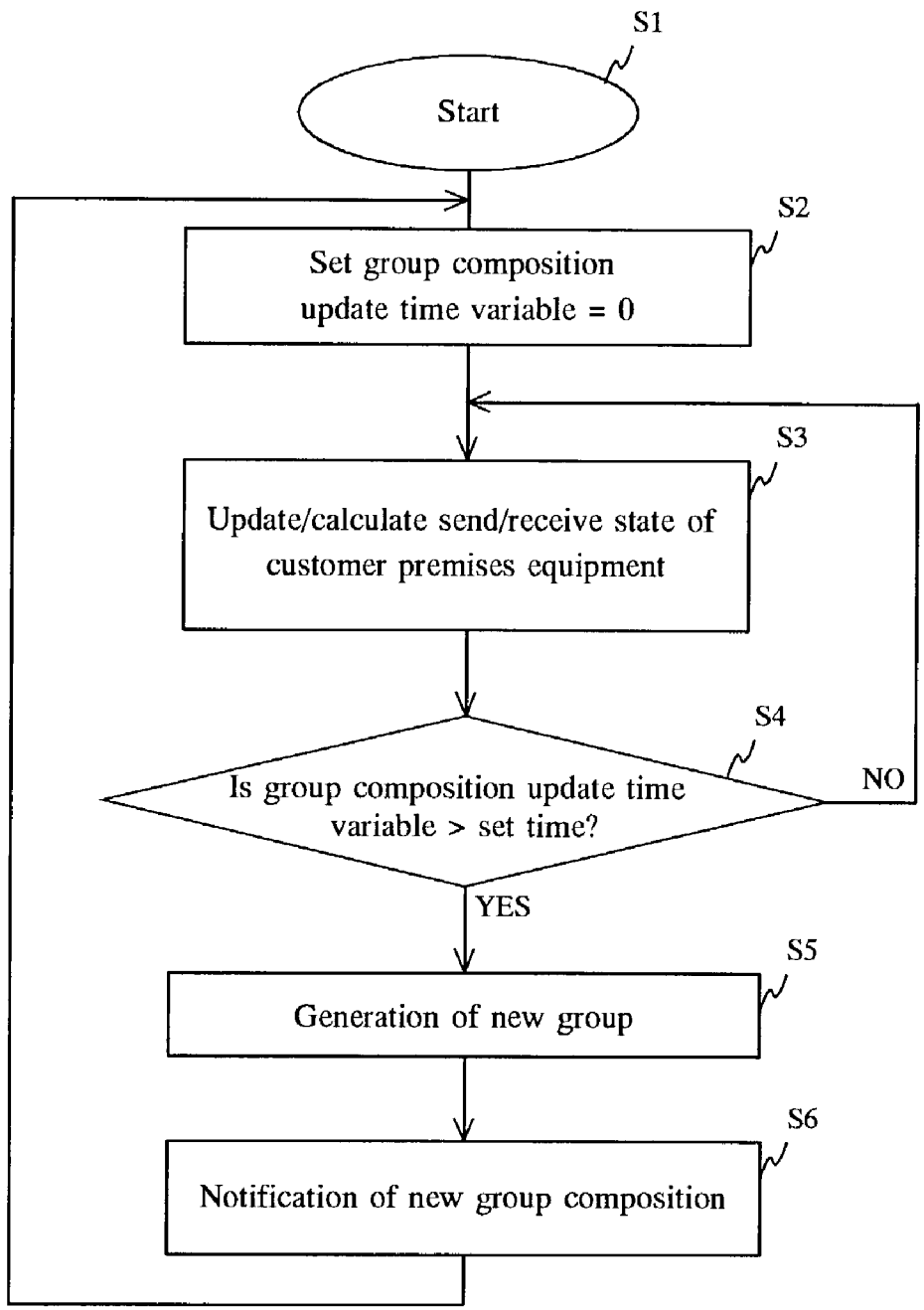
FIG. 7 is a flowchart showing an example of the operation of group assignment performed by the base station equipment.

FIG. 7 shows one example of the steps in the processing of this operation.

To wit, in the base station equipment, when wireless communication with customer premises equipment covered by the local station unit starts (Step S1), first the group composition update time variable is set to zero (=0) (Step S2), the group composition update time variable is incremented with a timer and during the period until the group composition update time variable reaches a preset value (the group composition update time) (Step S4), the send/receive state of the various covered customer premises equipment is calculated or updated (Step S3).

Here, as the calculation or updating of the send/receive state number of the respective customer premises equipment, in the base station equipment of this example, with a method wherein the number of times that LCCH is received from the respective customer premises equipment is taken to be the send state number of the respective customer premises equipment, the total number of times that SD (SD1, SD2) and LD are sent to the respective customer premises equipment is taken to be the receive state number of the respective customer premises equipment, a value found by subtracting the receive state number from the send state number of the respective customer premises equipment is taken to be the send/receive state number of the respective customer premises equipment, the calculation of this send/receive state number is performed and the calculated send/receive state number is saved by overwriting (updating) a value in memory, for example (Step S3 above). In this manner, the send/receive state number of the respective customer premises equipment is calculated as (send/receive state number)=(send state number of respective customer premises equipment)−(receive state number of respective customer premises equipment).

Next, when it is determined that the incremented value of the group composition update time variable reaches a preset value (the group composition update time) (Step S4), the send/receive state numbers of the respective customer premises equipment calculated during the period before the value of the group composition update time variable reached the preset value are rearranged in order from the one with the highest value to the one with the smallest value. Thereafter, first, the customer premises equipment with the largest send/receive state number and the customer premises equipment with the smallest send/receive state number are assigned to the same one group, and next, among the customer premises equipment excluding these two units of customer premises equipment, the customer premises equipment with the largest send/receive state number and the customer premises equipment with the smallest send/receive state number are assigned to the same one group, but a different group from the previous group, and then the same group allocation process is repeated until all of the customer premises equipment is assigned to groups, thereby generating a new group composition (Step S5).

Here, at the time of the group assignment process for customer premises equipment in this manner, in the event that a round of all the groups to be allocated is made, the assignment is performed again in order starting from the first group. Specifically, in the event that n (n is a plurality) groups are provided, in this example, the customer premises equipment is assigned to the respective groups with two units per group in the order Group 1, Group 2, . . . , Group n, Group 1, Group 2, . . . , Group n, . . . Note that in the event that the number of units of customer premises equipment covered by the base station equipment is an odd number, one unit of customer premises equipment will be left after the last assignment, so in the last assignment, this one unit of customer premises equipment is assigned to an appropriate group.

Moreover, the base station equipment uses BCCH to wirelessly send information containing the new group composition to all of the customer premises equipment that it covers, thereby notifying all of the customer premises equipment with this information (Step S6). Thereafter, the group composition update time variable is again set to zero and the aforementioned process of calculating the send/receive state numbers of the customer premises equipment and generating a new group composition (Step S2 through Step S6 above) is repeated.

Note that in the above process, when the send/receive state numbers of the customer premises equipment are reordered in decreasing order (Step S5 above), if the send/receive state numbers of two or more units of customer premises equipment become equal, these two or more units of customer premises equipment are reordered in an arbitrary order or an order based on preset rules, for example, it is possible to use rules that set forth conditions for customer premises equipment, for example, arranging them in priority order (order of descending send/receive state number).

Here follows a specific example of the process of group assignment in this example.

In this specific example, three groups, A, B and C are provided and one unit of base station equipment covers eight units of customer premises equipment 1-8.

In addition, if the customer premises equipment is reordered based on send/receive state numbers in decreasing order, they would be as shown in (1)-(8) below.

(1) The send/receive state number of customer premises unit 3 is the $1^{st}$ largest at 8.
(2) The send/receive state number of customer premises unit 1 is the $2^{nd}$ largest at 6.
(3) The send/receive state number of customer premises unit 5 is the $3^{rd}$ largest at 4.
(4) The send/receive state number of customer premises unit 2 is the $4^{th}$ largest at 0.
(5) The send/receive state number of customer premises unit 6 is the $5^{th}$ largest at −1.
(6) The send/receive state number of customer premises unit 4 is the $6^{th}$ largest at −3.
(7) The send/receive state number of customer premises unit 7 is the $7^{th}$ largest at −5.
(8) The send/receive state number of customer premises unit 8 is the $8^{th}$ largest at −9.

In this case, in the group assignment process of this example, the various customer premises units 1-8 are assigned to the Groups A, B and C in the order indicated by (1)-(4) below.

(1) Customer premises unit 3 and customer premises unit 8 are assigned to Group A.
(2) Customer premises unit 1 and customer premises unit 7 are assigned to Group B.
(3) Customer premises unit 5 and customer premises unit 4 are assigned to Group C.
(4) Customer premises unit 2 and customer premises unit 6 are assigned to Group A.

When the assignment of groups is performed in this manner, the total send/receive state number of Group A is −2 (=8−9+0−1), the total send/receive state number of Group B is 1 (=6−5) and the total send/receive state number of Group C is 1 (=4−3).

With such a group assignment, the send/receive state numbers of Groups A, B and C can be adjusted to a value near the optimal value of 0, and thus it is possible to reduce the number of unused channels (number of empty channels) in each of the Groups A, B and C, so the optimal group assignment can be achieved to maintain the throughput of the entire system in the optimal state.

As described above, in the subscriber wireless access system of this example, the amount of traffic in the uplink communication and downlink communication of the customer premises equipment covered by the base station equipment is monitored. The group assignment is generated and the assignment of groups is performed in order to bring the ratio of data used in uplink communication and downlink communication per stipulated time period of customer premises equipment (=(amount of data in uplink communication)/(amount of data in downlink communication)) to as close as possible to the ratio (in this example, 1) that permits the largest amount of data to be communicated by communication frame in uplink communication (sending) and the largest amount of data to be communicated in downlink communication (receiving). Thus the number of unused channels occurring in each of the groups can be reduced to increase the throughput of the entire system.

Note that in this example, the base station equipment is provided with traffic situation detection means, group assignment means and group assignment result notification means, while each unit of customer premises equipment is provided with group communication control means.

In addition, in this example, the results of a comparison of the amount of data sent and the amount of data received within a stipulated period of time prior to the group assignment is used as the traffic situation of the various customer premises equipment. Based on the results of this comparison, in order to reduce the empty channels that occur in the downlink communication and uplink communication of each group, group assignment is performed in order to adjust the total amount of sending and total amount of receiving of each group so that the difference between them (the send/receive state number) becomes a value close to zero.

Here follows a description of the second mode of the invention.

Here follows a description of a preferred embodiment of the control of group assignment and the like in the subscriber wireless access system as shown in FIG. 1 through FIG. 6 above.

In the wireless communications system of this example, the base station equipment and various customer premises equipment are provided with functions for performing the control of group assignment according to the present invention.

Specifically, the base station equipment of this example is provided with: a function for detecting the usage situation of the send channels and receive channels of each of the units of customer premises equipment covered by this base station equipment, a function for assigning groups depending on the results of this detection and reconfiguring the customer premises equipment assigned to the various groups, and a function for directing the customer premises equipment to shift to new groups after every update period (group composition update time period) for periodically performing this reconfiguration (group assignment). In addition, each unit of customer premises equipment is provided with a function for changing the group to which the local station unit (that unit of customer premises equipment) belongs according to the directions from the base station equipment.

Here, in this example, the way for the base station unit to detect the usage situation of the send channels of the customer premises equipment used is a way of detecting the number of times short data had been received on the short data channel (SU) and the number of times long data had been received on the long data channel (LU) from the various units of customer premises equipment during the group composition update time period as the usage situation of the send channels of the various units of customer premises equipment. Note that as an example of another constitution, it is also possible to use a way of detecting the number of times short data channel (SU) send requests had been received and the number of times long data channel (LU) send requests had been received by the base station equipment on the LCCH from the various units of customer premises equipment during the group composition update time period as the usage situation of the send channels of the various units of customer premises equipment.

In addition, in this example, the way for the base station unit to detect the usage situation of the receive channels of the customer premises equipment used is a way of detecting the number of times short data had been sent on the short data channel (SD) and the number of times long data had been sent on the long data channel (LD) to the various units of customer premises equipment during the group composition update time period as the usage situation of the receive channels of the various units of customer premises equipment. Note that as an example of another constitution, it is also possible to use a way of detecting the number of times short data channel (SD) send requests had been received and the number of times long data channel (LD) send requests had been received by the base station equipment on the LCCH from the various units of customer premises equipment during the group composition update time period as the usage situation of the receive channels of the various units of customer premises equipment.

In addition, the way for the base station unit to direct the customer premises equipment to shift groups every group composition update time period used is a way of using BCCH to notify the various customer premises equipment of content of these directions.

In addition, the way for each unit of customer premises equipment to change the group to which the local station unit (that unit of customer premises equipment) belongs according to the directions notified from the base station equipment used is a way wherein: when each unit of customer premises equipment receives the content of these directions from the base station equipment on the BCCH, all of the frames used in wireless communication with the base station equipment are taken to be receive frames and BCCH is received on all of these frames, and each unit searches through this received BCCH for a BCCH corresponding to the directed group as the one to which the local station unit is assigned, determines the send frames and receive frames used in the communication of the group to which the local station unit is assigned as the channel to be received by the local station unit, and performs subsequent send and receive operations using the send frames and receive frames thus determined.

Note that in this example, information sent from the base station equipment on each BCCH contains information that indicates the group corresponding to each BCCH, and by each unit of customer premises equipment searching for the BCCH containing information that indicates the group to which the local station unit is assigned, the aforementioned send and receive operations are performed by taking the BCCH thus found as the BCCH corresponding to the group to which the local station unit is assigned.

Here follows an example of the operation of group assignment performed by means of the base station equipment of this example.

Figure 8:
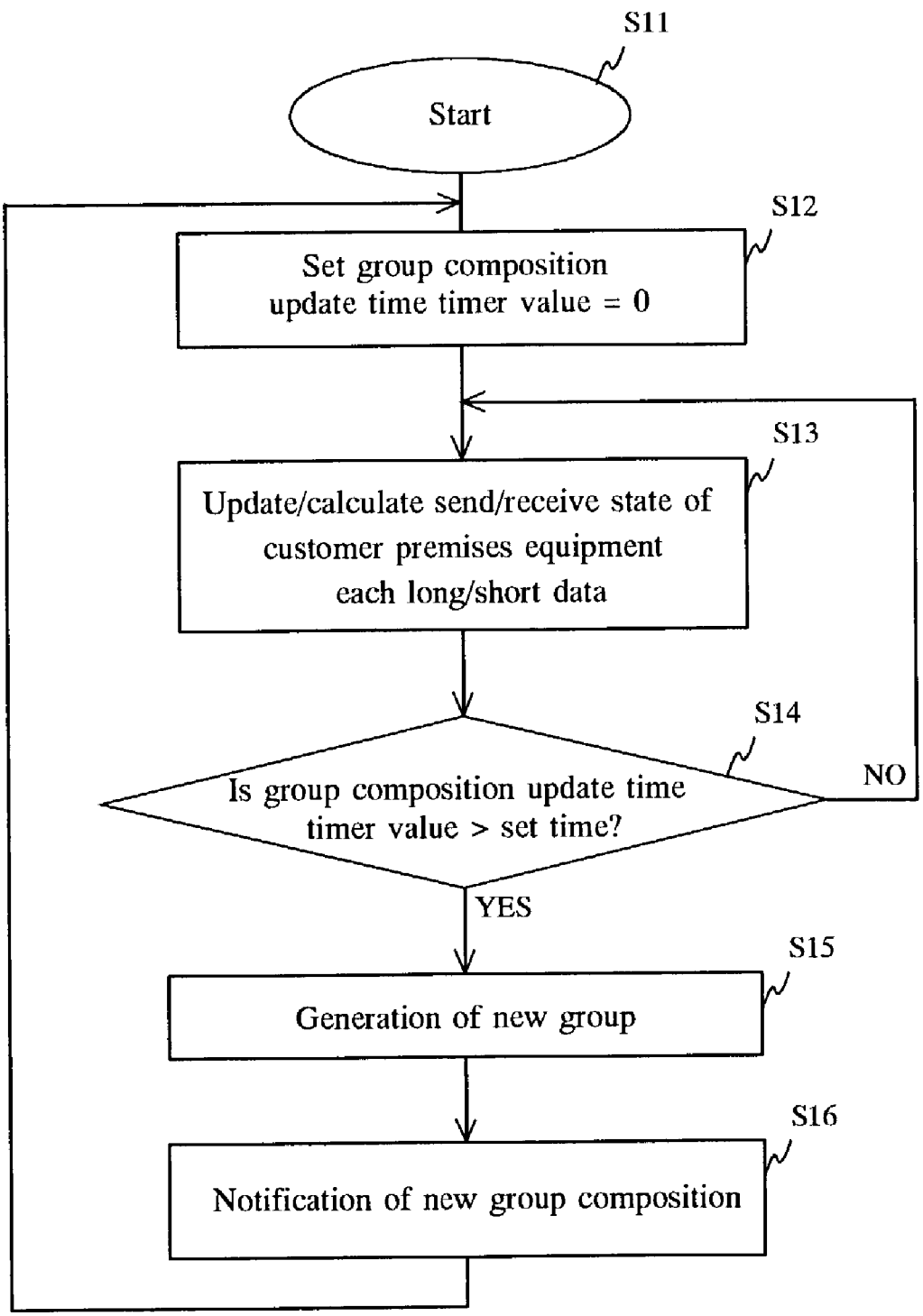
FIG. 8 is a flowchart showing an example of the operation of group assignment performed by the base station equipment.

FIG. 8 shows one example of the steps in the processing of this operation.

To wit, in the base station equipment, when wireless communication with customer premises equipment covered by the local station unit starts (Step S11), first the group composition update time timer value is set to zero (=0) (Step S12), the composition update time timer value is incremented with a timer and during the period until the composition update time timer value reaches a preset value (the group composition update time) (Step S14), the send/receive state of the various covered customer premises equipment is calculated or updated (Step S13).

Here, in the calculation or updating of the send/receive state number of the respective customer premises equipment, in the base station equipment of this example, the number of times that short data (SU) is received from the respective customer premises equipment is taken to be the short data channel send state number of the respective customer premises equipment, the number of times that long data (LU) is received from the respective customer premises equipment is taken to be the long data channel send state number of the respective customer premises equipment, the number of times that short data (SD) is sent to the respective customer premises equipment is taken to be the short data channel receive state number of the respective customer premises equipment, and the number of times that long data (LD) is sent to the respective customer premises equipment is taken to be the long data channel receive state number of the respective customer premises equipment.

Moreover, with a method whereby a value found by subtracting the short data channel receive state number from the short data channel send state number of the respective customer premises equipment is taken to be the short data channel send/receive state number of the respective customer premises equipment, and a value found by subtracting the long data channel receive state number from the long data channel send state number of the respective customer premises equipment is taken to be the long data channel send/receive state number of the respective customer premises equipment, the calculation of these send/receive state numbers is performed and the calculated send/receive state numbers are saved by overwriting (updating) a value in memory, for example (Step S13 above). In this manner, for both the short data channel and long data channel, the send/receive state number of the respective customer premises equipment is calculated as (send/receive state number) =(send state number of respective customer premises equipment)−(receive state number of respective customer premises equipment).

Next, when it is determined that the incremented composition update time timer value reaches a preset value (the group composition update time) (Step S14), the send/receive state numbers of the respective customer premises equipment calculated during the period before the composition update time timer value reached the preset value are rearranged in order from the one with the highest value to the one with the smallest value. Here, in this example, first, as the first priority order, the customer premises equipment is arranged in order from that with a large value of the long data channel send/receive state number to that with a small value. Next, as the second priority order, the customer premises equipment with the same long data channel send/receive state number is arranged in order from that with a large value of the short data channel send/receive state number to that with a small value.

Thereafter, first, the customer premises equipment with the largest send/receive state number and the customer premises equipment with the smallest send/receive state number are assigned to the same one group, and next, among the customer premises equipment excluding these two units of customer premises equipment, the customer premises equipment with the largest send/receive state number and the customer premises equipment with the smallest send/receive state number are assigned to the same one group, but a different group from the previous group, and then the same group allocation process is repeated until all of the customer premises equipment is assigned to groups, thereby generating a new group composition (Step S15).

Here, at the time of the group assignment process for customer premises equipment in this manner, in the event that a round of all the groups to be allocated is made, the assignment is performed again in order starting from the first group. Specifically, in this example, in the event that n (n is a plurality) groups are provided, as one example, the customer premises equipment may be assigned to the respective groups with two units per group in the order Group 1, Group 2, . . . , Group n, Group 1, Group 2, . . . , Group n, . . . or as another example, the customer premises equipment may be assigned to the respective groups with two units per group in the order Group 1, Group 2, . . . , Group n, Group n, Group (n−1), . . . , Group 1, . . . Note that in the event that the number of units of customer premises equipment covered by the base station equipment is an odd number, one unit of customer premises equipment will be left after the last assignment, so in the last assignment, this one unit of customer premises equipment is assigned to an appropriate group.

Moreover, the base station equipment uses BCCH to wirelessly send information containing the new group composition to all of the customer premises equipment that it covers, thereby notifying all of the customer premises equipment with this information (Step S16). Thereafter, the group composition update time timer value is again set to zero and the aforementioned process of calculating the send/receive state numbers of the customer premises equipment and generating a new group composition (Step S12 through Step S16 above) is repeated.

Note that in the above process, when the send/receive state numbers of the customer premises equipment are reordered in decreasing order (Step S15 above), if the send/receive state numbers of two or more units of customer premises equipment become equal, these two or more units of customer premises equipment are reordered in an arbitrary order or an order based on preset rules, for example. Here, as the preset rules, it is possible to use rules that set forth conditions for customer premises equipment, for example, arranging them in priority order (order of descending send/receive state number).

Here follows a specific example of the process of group assignment in this example.

In this specific example, two groups, A and B are provided and one unit of base station equipment covers eight units of customer premises equipment 1-8.

In addition, if the customer premises equipment is reordered based on send/receive state numbers in decreasing order, they would be as shown in (1)-(8) below.

(1) The send/receive state number of customer premises unit 3 is the $1^{st}$ largest, with a long data channel send/receive state number of 8 and a short data channel send/receive state number of 8.

(2) The send/receive state number of customer premises unit 1 is the $2^{nd}$ largest, with a long data channel send/receive state number of 8 and a short data channel send/receive state number of −7.

(3) The send/receive state number of customer premises unit 5 is the 3$^{rd}$ largest, with a long data channel send/receive state number of 4 and a short data channel send/receive state number of 4.
(4) The send/receive state number of customer premises unit 2 is the 4$^{th}$ largest, with a long data channel send/receive state number of 4 and a short data channel send/receive state number of 2.
(5) The send/receive state number of customer premises unit 6 is the 5$^{th}$ largest, with a long data channel send/receive state number of −4 and a short data channel send/receive state number of 5.
(6) The send/receive state number of customer premises unit 4 is the 6$^{th}$ largest, with a long data channel send/receive state number of −4 and a short data channel send/receive state number of −5.
(7) The send/receive state number of customer premises unit 7 is the 7$^{th}$ largest, with a long data channel send/receive state number of −7 and a short data channel send/receive state number of 8.
(8) The send/receive state number of customer premises unit 8 is the 8$^{th}$ largest, with a long data channel send/receive state number of −8 and a short data channel send/receive state number of −16.

In this case, in the group assignment process of this example, the various customer premises units 1-8 are assigned to the Groups A and B in the order indicated by (1)-(5) below.
(1) Customer premises unit 3 and customer premises unit 8 are assigned to Group A.
(2) Customer premises unit 1 and customer premises unit 7 are assigned to Group B.
(3) Customer premises unit 5 and customer premises unit 4 are assigned to Group B.
(4) Customer premises unit 2 and customer premises unit 6 are assigned to Group A.
(5) As a result, management is performed with customer premises units 2, 3, 6 and 8 assigned to Group A and customer premises units 1, 4, 5 and 7 assigned to Group B.

When the assignment of groups is performed in this manner, the total send/receive state numbers of Group A are 0 (=4+8−4−8) for the short data channel and −1 (=2+8+5−16) for the long data channel and the total send/receive state numbers of Group B are 1 (=2+8+5−16) for the short data channel and 0 (=−7−5+4+8) for the long data channel.

With such a group assignment, the send/receive state numbers of Groups A and B can be adjusted to a value near the optimal value of 0, and thus it is possible to reduce the number of unused channels (number of empty channels) in each of the Groups A and B, so the optimal group assignment can be achieved to maintain the throughput of the entire system in the optimal state.

As described above, in the subscriber wireless access system of this example, when wireless communication is performed by means of a time-division multiplexing communications protocol using wireless frames in downlink communication from the base station equipment to a plurality of units of customer premises equipment and in uplink communication from a plurality of units of customer premises equipment to the base station equipment, the wireless frames themselves are given definitions regarding groups and thus each unit of customer premises equipment does not access the base station equipment with sending and receiving simultaneously. In this case, based on the result of tabulating the traffic situation between the base station equipment and the plurality of units of customer premises equipment over a fixed time period, in order to avoid unbalanced traffic situations for each group, for example, the base station equipment periodically executes a shift in groups for the various units of customer premises equipment, and thereby the probability of unused channels occurring in each of the groups can be reduced to increase the throughput of the entire system. Thereby, it is possible to achieve an optimal group composition in a P-MP system.

More specifically, in the subscriber wireless access system of this example, in the event that a group composition with an unbalanced traffic situation should arise, such as where there are groups containing customer premises equipment that uses more downlink or uplink short data channels, or where there are groups containing customer premises equipment that uses more downlink or uplink long data channels, the base station equipment adjusts the assignment of groups and shifts the customer premises equipment to achieve an optimal group composition, and thus the number of empty channels for short data channels or long data channels occurring in the respective groups is reduced, so the throughput of the entire system can be maintained in the optimal state.

To wit, in the subscriber wireless access system of this example, the base station equipment divides the plurality of units of customer premises equipment into groups, and when performing wireless communication with each group of customer premises equipment using wireless frames which manage these groups, in the event that a difference in the efficiency of usage of short data channels or the efficiency of usage of long data channels is detected in the way of dividing the customer premises equipment into groups due to customer premises equipment with a high usage of short data channels or customer premises equipment with a high usage of long data channels, for example, by dividing the customer premises equipment into appropriate groups, the throughput of the entire system may be optimized.

Note that in this example, a subscriber wireless access system is used as the wireless communications system, the base station equipment of a subscriber wireless access system is used as the base station equipment and the customer premises equipment of a subscriber wireless access system is used as the customer premises equipment.

In addition, in this example, the base station equipment is provided with the function of the data channel usage detection means, the function of the group assignment means and the function of the group assignment result notification means, while the customer premises equipment (communications station units) are provided with the function of the group communication control means.

Here follows a description of the third mode of the invention.

Next, we shall describe the wireless communication performed by the wireless communications system according to this example.

Figure 9:
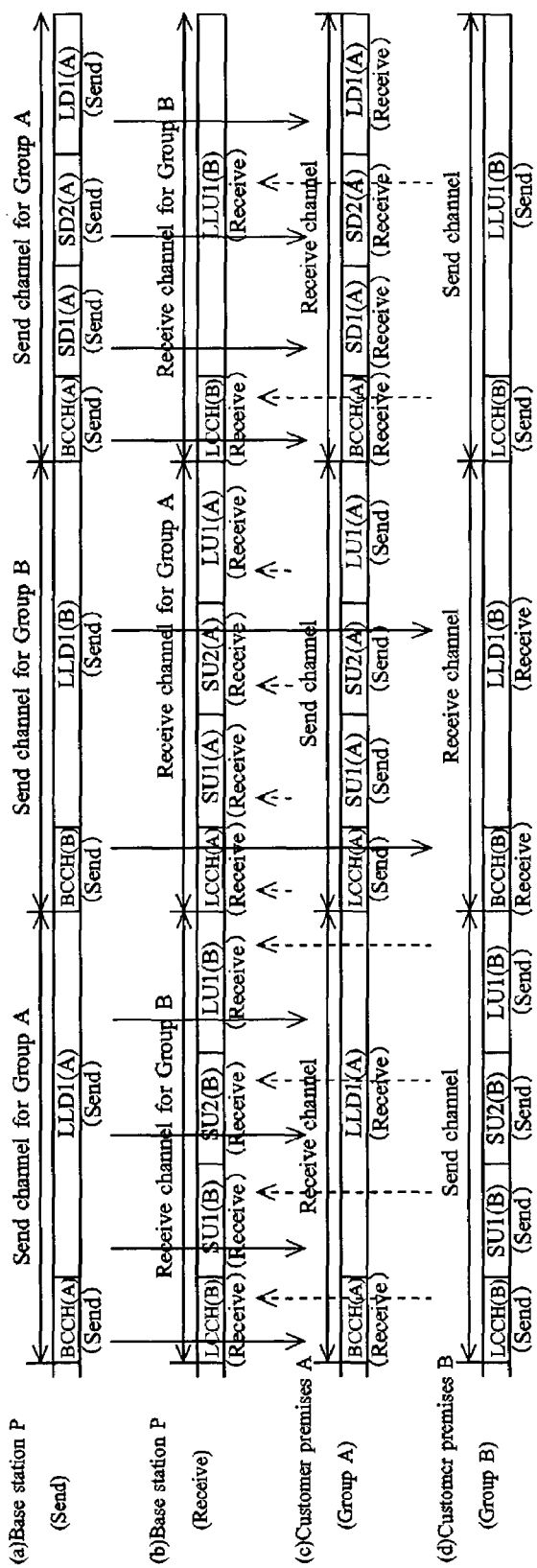
FIGS. 9(a)-9(d) are diagrams of an example of the constitution of a communication frame with a 2-group constitution according to a preferred embodiment of the present invention.

FIGS. 9(*a*)-9(*d*) show an example of the composition of a communication frame that can be used in wireless communication performed between the base station equipment 11-14 and customer premises equipment 21-26 in the wireless communications system in this example. Note that this example illustrates the case in which the present invention is applied to the communication frames that have the composition shown in FIG. 4 above, but the present invention may also be applied to various other communication frames such as communication frames that have the composition shown in FIG. 5, for example.

This example shows the case in which the customer premises equipment 21-26 covered under the domain of one unit of base station equipment 11-14 is divided into two groups, Group A and Group B, and in the following, for convenience in the description, we will describe an example of the case in which the base station unit P covers customer premises unit A and customer premises unit B, one customer premises unit A belongs to Group A and one customer premises unit B belongs to Group B.

Here, the "group" referred to in this example defines a set of customer premises units that perform downlink communication in the same time band and also perform uplink communication in the same time band. Moreover, in this example, for each unit frame for downlink communication consisting of one broadcast control channel (BCCH) and a downlink communication data sending region, downlink communication is performed with the unit frames used exclusively by customer premises equipment belonging to a specific group assigned to each unit frame. Similarly, for each unit frame for uplink communication consisting of one link control channel (BCCH) and an uplink communication data sending region, uplink communication is performed with the unit frames used exclusively by customer premises equipment belonging to a specific group assigned to each unit frame.

In addition, in this example, the downlink communication data sending region either may be set to comprise either two downlink-only short data channels (SD1, SD2) and one downlink-only long data channel (LD1), or may be set to comprise one extra-long data channel (LLD1) in the downlink direction, and one or the other of these is used depending on the traffic situation.

In addition, in this example, the uplink communication data sending region either may be set to comprise either two uplink-only short data channels (SU1, SU2) and one up-only long data channel (LU1), or may be set to comprise one extra-long data channel (LLU1) in the uplink direction, and one or the other of these is used depending on the traffic situation.

Note that the BCCH, SD1, SD2, LD1, LCCH, SU1, SU2 and LU1 shown in this example have the same roles as in the communication frame shown in FIG. 8 above, but in this example, those used by Group A have "(A)" appended to the name of the channel while those used by Group B have "(B)" appended to the name of the channel.

In addition, in the same manner as the communication frame shown in FIG. 8 above, the base station unit P performs sending and receiving simultaneously for the communication frame of this example, but the communication frame of this example has the customer premises units A and B performing sending and receiving in different time bands.

In addition, the LLD1 shown in this example is a downlink traffic channel for sending, from the base station equipment to the customer premises equipment, extremely long data that is longer than the LD1, for example. In this example, those used by Group A have "(A)" appended to the name of the channel while those used by Group B have "(B)" appended to the name of the channel.

In addition, the LLU1 shown in this example is an uplink traffic channel for sending, from the customer premises equipment to the base station equipment, extremely long data that is longer than the LU1, for example. In this example, those used by Group A have "(A)" appended to the name of the channel while those used by Group B have "(B)" appended to the name of the channel.

Moreover, in this example, in the downlink communication frame, Group A and Group B are allocated alternately in a plurality of unit frames lined up consecutively. To wit, in the first frame, downlink communication is performed from the base station unit P to the customer premises unit A of Group A, in the second frame, downlink communication is performed from the base station unit P to the customer premises unit B of Group B, and in the third frame, downlink communication is performed from the base station unit P to the customer premises unit A of Group A, . . . , so the downlink communication of Group A and the downlink communication of Group B are performed alternately.

Similarly, in this example, in the uplink communication frame, Group A and Group B are allocated alternately in a plurality of unit frames lined up consecutively. To wit, in the first frame, uplink communication is performed from the customer premises unit B of Group B to the base station unit P, in the second frame, uplink communication is performed from the customer premises unit A of Group A to the base station unit P, and in the third frame, uplink communication is performed from the customer premises unit B of Group B to the base station unit P, . . . , so the uplink communication of Group A and the uplink communication of Group B are performed alternately.

Specifically, as shown in FIG. 9(a), in downlink communication, the base station unit P performs sending to customer premises unit A of Group A in the order BCCH(A), LLD1 (A) in the first frame at the beginning. In addition, in this first frame, as shown in FIG. 9(b), in uplink communication, the base station unit P receives data (radio waves) from customer premises unit B of Group B in the order LCCH(B), SU1(B), SU2(B), LU1(B).

In addition, in the next second frame, as shown in FIG. 9(a), in downlink communication, the base station unit P performs sending to customer premises unit B of Group B in the order BCCH(B), LLD1(B). In addition, in this second frame, as shown in FIG. 9(b), in uplink communication, the base station unit P receives data (radio waves) from customer premises unit A of Group A in the order LCCH(A), SU1(A), SU2(A), LU1(A).

In addition, in the next third frame, as shown in FIG. 9(a), in downlink communication, the base station unit P performs sending to customer premises unit A of Group A in the order BCCH(A), SD1(A), SD2(A), LD1(A). In addition, in this third frame, as shown in FIG. 9(b), in uplink communication, the base station unit P receives data (radio waves) from customer premises unit B of Group B in the order LCCH(B), LLU1(B).

On the other hand, as shown in FIG. 9(c), the customer premises unit A of Group A performs receiving from base station unit P in the order BCCH(A), LLD1(A) in the first frame at the beginning. In the second frame, an arbitrary customer premises unit A uses LCCH(A) to perform sending to the base station unit P, and the customer premises unit A permitted to send performs sending to the base station unit P in the order SU1(A), SU2(A), LU1(A), and in the third frame, performs receiving from the base station unit P in the order BCCH(A), SD1(A), SD2(A), LD1(A).

In addition, as shown in FIG. 9(d), the customer premises unit B of Group B uses LCCH(B) to perform sending to base station unit P, and the customer premises unit B permitted to send performs sending to the base station unit P in the order SU1(B), SU2(B), LU1(B), in the next second frame performs receiving from the base station unit P in the order BCCH(B), LLD1(B) and in the next third frame an arbitrary customer premises unit B uses LCCH(B) to performs sending to the base station unit P, and the customer premises unit B permitted to send uses LLU1(B) to perform sending to the base station unit P.

Here, the decision of whether to use in the frames for downlink communication from the base station unit P to the customer premises units A and B either the combination of data channels SD1, SD2 and LD1 or the LLD1 data channel is made by the base station unit P using the BCCH to the customer premises units A and B in the groups A and B to make a notification to the customer premises units A and B in the groups A and B. Note that various ways can be used as the way of making this notification, such as the way of making the notification only when LLD1 is to be used, or the way of making the notification always regardless of whether or not LLD1 is used.

Here, the decision of whether to use in the frames for uplink communication from the customer premises units A and B to the base station unit P either the combination of data channels SU1, SU2 and LU1 or the LLU1 data channel is made by the customer premises units A and B in the groups A and B using the LCCH to the base station unit P to make a notification to the base station unit P. In addition, when the base station unit P makes a response to this notification from the customer premises units A and B, it uses the BCCH to the customer premises units A and B in the groups A and B. Note that various ways can be used as the way of making this notification, such as the way of making the notification only when LLU1 is to be used, or the way of making the notification always regardless of whether or not LLU1 is used.

As an example, when customer premises unit A or B desires to use LLU1 for uplink communication, it uses LCCH to send a request for uplink communication using LLU1 to the base station unit P, and on the other hand, if the base station unit P permits this request received from customer premises unit A or B, it uses BCCH to send to this customer premises unit A or B a notification to the effect of granting this request. Thereby, upon receiving notification from the base station unit P to the effect that this request is granted, the customer premises unit A or B performs uplink communication using LLU1. Note that in this example, customer premises unit A of Group 1 uses LCCH(A) to make the request for data communication using LLU1(A), while customer premises unit B of Group 1 uses LCCH(B) to make the request for data communication using LLU1(B).

Specifically, in this example, the base station unit P uses BCCH(A) in the first frame to notify customer premises unit A of Group A that will perform data communication using LLD1(A), and then uses LLD1(A) of this first frame to send data to this customer premises unit A. In addition, in this example, the customer premises unit B of Group B uses LCCH(A) in the first frame to send to base station unit P a request that it desires to perform data communication using LLU1(B), and in response to having received this request, the base station unit P uses BCCH(B) of the second frame to send a notification to customer premises unit B to the effect that the request is granted, and upon receiving this notification of permission, customer premises unit B sets up LLU1(B) in the third frame and uses this LLU1(B) to send data to the base station unit P.

As described above, in the subscriber wireless access system of this example, wireless communication is performed by means of a time-division multiplexing communications protocol using wireless frames in downlink communication from the base station equipment to a plurality of units of customer premises equipment and in uplink communication from a plurality of units of customer premises equipment to the base station equipment, the wireless frames themselves are given definitions regarding groups and thus each unit of customer premises equipment does not access the base station equipment with sending and receiving simultaneously. At this time, it is possibly to set a variable data channel length used in data communication. Note that this time-division multiplexing is implemented using TDMA (Time Division Multiple Access).

Specifically, in the subscriber wireless access system of this example, the communication frames in the downlink direction may be set as either a combination of two short data channels (SD1, SD2) and one only long data channel (LD1) or one extra-long data channel (LLD1). In addition, the communication frames in the uplink direction may be set as either a combination of two short data channels (SU1, SU2) and one only long data channel (LU1) or one extra-long data channel (LLU1).

Accordingly, with the subscriber wireless access system of this example, it is possible to solve the typical problem in P-MP wireless data transmission wherein the customer premises unit becomes more expensive and has a higher power consumption if sending and receive are performed simultaneously, and thus it is possible to lower the cost of the customer premises equipment and achieve lower power consumption, and also a frame composition with good transfer efficiency can be achieved.

In addition, with the subscriber wireless access system of this example, it is possible to set the length of the data channel used in data communication variably as needed, so the data throughput can be increased. In addition, it is possible to set up the extra-long data channels LLD1 and LLU1, so the efficiency of transmission of even extremely long data can be increased.

Note that in this example, customer premises equipment can be used as the communications station units.

In addition, in this example, the LLD1 and LLU1 regions contained within one communication frame such as that shown in FIG. 8, or the region combining the SD1, SD2 and LD1 or the region combining the SU1, SU2 and LU1 contained within one communication frame can be used as the region for sending data (data send region).

In addition, with the base station unit or communications station unit of this example, a function for performing data communication using extra-long data channels in communication between the two with the timing mutually synchronized is used to constitute the data communication control means.

Here, the configuration of the wireless communications equipment and station units (base station units or communications station units) according to the present invention is not necessarily limited to that illustrated above, but rather various configurations may be used. As one example, various numbers can be used as the number of groups formed, and also, the number of channels contained in the communication frames having a group composition and the length (time) of each channel may be set arbitrarily. Note that the present invention may also provide a method for executing the processing according to the present invention or a computer program for achieving such a method.

In addition, the field of application of the present invention is not necessarily limited to that illustrated above, but rather the present invention may be applied to various fields. As an example, the preferred embodiments presented the case of applying the present invention to a subscriber wireless access system using customer premises equipment as the communications station unit, yet this is not a limitation, but rather the present invention may also be applied to various wireless communications systems.

In addition, the various processing performed in the wireless communications equipment and station units (base station units or communications station units) according to the present invention may be constituted by being implemented in hardware resources equipped with a processor and memory and the like, for example, being controlled by means of a processor executing a control program stored in read-only memory (ROM). In addition, the various functional means for executing this processing may also be constituted as independent hardware circuits.

In addition, the present invention may also be understood as one wherein the above control program (itself) is stored in a floppy disc®, CD-ROM or other computer-readable recording media, so that the processing according to the present invention can be implemented by loading said control program from the recording medium into a computer and executing the program by a processor.

In addition, with the wireless communications system according to the first mode of the present invention, in a constitution wherein: a base station unit covers a plurality of communications station units and downlink communication from the base station unit to the communications station unit and uplink communication from the communications station unit to the base station unit are performed wirelessly, each of the communications station units covered by the base station unit is assigned to one of a plurality of groups that perform receiving or sending in the same time band, each group's communication time band is made different for downlink communication and for uplink communication, when the downlink communication and uplink communication between the base station unit and plurality of communications station units is performed in time-division multiplexing regarding each of said plurality of groups, at the time of group assignment, the total amount of sending and total amount of receiving are adjusted for each group based on the traffic situation of each communications station unit, and thus a good group assignment can be achieved to increase the throughput of the wireless communications system.

In addition, with the wireless communications system according to the second mode of the present invention, in a constitution wherein: a base station unit covers a plurality of communications station units and downlink communication from the base station unit to the communications station unit and uplink communication from the communications station unit to the base station unit are performed wirelessly, each of the communications station units covered by the base station unit is assigned to one of a plurality of groups that perform receiving or sending in the same time band, each group's communication time band is made different for downlink communication and for uplink communication, when frames containing short data channels for sending short data and long data channels for sending long data are used to perform downlink communication and uplink communication between the base station unit and plurality of communications station units in time-division multiplexing regarding each of the plurality of groups, at the time of group assignment, the total number of data channels used by each group are adjusted based on the number of data channels used by each communications station unit, and thus a good group assignment can be achieved to increase the throughput of the wireless communications system.

In addition, with the wireless communications system according to the third mode of the present invention, in a constitution wherein: a base station unit covers a plurality of communications station units and downlink communication from the base station unit to the communications station unit and uplink communication from the communications station unit to the base station unit are performed wirelessly, each of the communications station units covered by the base station unit is assigned to one of a plurality of groups that perform receiving or sending in the same time band, each group's communication time band is made different for downlink communication and for uplink communication, when frames containing a region for sending data are used to perform downlink communication and uplink communication between the base station unit and plurality of communications station units in time-division multiplexing regarding each of the plurality of groups, in one or both of downlink communication and uplink communication, data communication may be performed using all of the region for sending data contained within the frame as a single data channel, depending on the traffic situation, so the efficiency of data communication in downlink communication and uplink communication can be increased.

What is claimed is:

1. A wireless communications system comprising:
a plurality of communications station units; and
a base station unit operable to wirelessly communicate with the communications station units, wherein
each of the communications station units is operable to wirelessly communicate with the base station unit,
each of the communications station units is assigned to one of a plurality of groups that perform at least one of receiving and sending in a same communication time band, each of the groups having a different communication time band for downlink communication and uplink communication, the downlink communication and the uplink communication between the base station unit and the communications station units being performed with time-division multiplexing regarding each of the groups, and, at a time of group assignment, a total amount of sending and a total amount of receiving are adjusted for each of the groups based on a traffic situation of each of the communications station units,
the base station unit comprises:
a traffic situation detection unit to detect the traffic situation of the communications station units;
a group assignment unit to assign the communications station units to the groups based on results detected by the traffic situation detection unit; and
a group assignment result notification unit to provide information to the communications station units based on results of the group assignment by the group assignment unit,
each of the communications station units comprises:
a group communication control unit, based on the information from the base station unit, perform the downlink communication and the uplink communication as a member of the group to which the communications station unit is assigned,
the traffic situation detection unit is to detect a number of times that a data send request is received from each of the communications station units during a group composition update time period as a usage situation of send channels and detect a number of times that data sending is performed to each of the communications station units during the group composition update time period as a usage situation of receive channels, and
the group assignment unit is to take a value found by subtracting the number of times that the data send request is received from the number of times that the data sending is performed for each of the communications station units to be a send/receive state number of the respective communications station unit, assign the communications station unit with a largest send/receive state number and the communications station unit with a smallest send/receive state number to the same group, and repeat, among the communications station units excluding the assigned communications station units, the assignment of the communications station unit with the largest send/receive state number and the communications station unit with the smallest send/receive state number to a same group that is different than any group having communications station units previously assigned thereto until all of the communications station units are assigned to the groups.

2. The wireless communications system according to claim 1, wherein the base station unit is operable to wirelessly communicate with the communications station units with downlink communication frames, each of the communications station units is operable to wirelessly communicate with the base station unit with uplink communication frames, and the downlink communication frames and the uplink communication frames of each of the groups are disposed in different communications time bands.

3. The wireless communications system according to claim 1, wherein the plurality of groups is at least four groups, and a communications time band of another of the at least four groups is provided between the downlink communication time band and the uplink communication time band of each of the at least four groups.

4. The wireless communications system according to claim 3, wherein the downlink communication for each of the at least four groups is performed using a plurality of downlink traffic channels and the uplink communication for each of the at least four groups is performed using a plurality of uplink traffic channels, and the wireless communication between the base station unit and the plurality of communications station units is performed using communication frames, whereby traffic channels of another of the at least four groups are placed between the downlink traffic channels and the uplink traffic channels of the each of the at least four groups and corresponding downlink traffic channels of the at least four groups form a downlink traffic channel block, and corresponding uplink traffic channels of the at least four groups form an uplink traffic channel block.

5. A wireless communications system comprising:

a plurality of communications station units; and a base station unit to wirelessly communicate with the communications station units, wherein each of the communications station units is to wirelessly communicate with the base station unit, each of the communications station units is assigned to one of a plurality of groups that perform at least one of receiving and sending in a same communication time band, each of the groups having a different communication time band for downlink communication and uplink communication, the downlink communication and the uplink communication between the base station unit and the communications station units being performed with time-division multiplexing regarding each of the groups, and, at a time of group assignment, a total amount of sending and a total amount of receiving are adjusted for each of the groups based on a traffic situation of each of the communications station units, the base station unit comprises:

a traffic situation detection unit to detect the traffic situation of the communications station units;

a group assignment unit to assign the communications station units to the groups based on results detected by the traffic situation detection unit; and a group assignment result notification unit to provide information to the communications station units based on results of the group assignment by the group assignment unit, each of the communications station units comprises:

a group communication control unit to, based on the information from the base station unit, perform the downlink communication and the uplink communication as a member of the group to which the communications station unit is assigned, each of the group communication control units, when the corresponding communications station unit receives the information from the base station unit on a broadcast control channel, is to take all frames used in wireless communication with the base station unit to be receive frames and receive broadcast control channels on all of the receive frames, search through the received broadcast control channels for a broadcast control channel corresponding to the group to which the corresponding communications station unit is assigned, determine send frames and receive frames used in the wireless communication for the group to which the corresponding communications station unit is assigned, and perform subsequent send and receive operations using the determined send frames and receive frames, and group assignment unit is to assign the communications station units to the groups such that the communications station unit with a largest send/receive state number and the communications station unit with a smallest send/receive state number to the same group, and repeat, among the communications station units excluding the assigned communications station units, the assignment of the communications station unit with the largest send/receive state number and the communications station unit with the smallest send/receive state number to a same group that is different than any group having communications station units previously assigned thereto until all of the communications station units are assigned to the groups.

6. The wireless communications system according to claim 5, wherein the base station unit is operable to assign the communications station units to the groups based on a comparison of an amount of data sent and an amount of data received by the communications station units per a stipulated time period.

7. The wireless communications system according to claim 5, wherein the base station unit is operable to assign the communications station units to the groups so as to reduce empty communications time in the uplink communication and the downlink communication of the groups.

8. The wireless communications system according to claim 5, wherein the base station unit and the communications station units communicate wirelessly using communication frames disposed for the groups, and downlink communication frames for performing the downlink communication of each of the groups and uplink communication frames for performing the uplink communication of each of the groups are disposed such that the downlink communication frames and the uplink communication frames of a same group are disposed in different communication time bands.

9. The wireless communications system according to claim 5, wherein the plurality of groups is at least four groups, and a communications time band of another group of the at least four groups is provided between the downlink communication time band and the uplink communication time band of each of the at least four groups.

10. The wireless communications system according to claim 9, wherein the downlink communication for each of the at least four groups is performed using a plurality of downlink traffic channels and the uplink communication for each of the at least four groups is performed using a plurality of uplink traffic channels, and the wireless communication between the base station unit and the plurality of communications station units is performed using communication frames, whereby traffic channels of another of the at least four groups are placed between the downlink traffic channels and the uplink traffic channels of the each of the at least four groups and corresponding downlink traffic channels of the at least four groups form a downlink traffic channel block, and corresponding uplink traffic channels of the at least four groups form an uplink traffic channel block.

11. A wireless communications system comprising:

a plurality of communications station units; and a base station unit operable to wirelessly communicate with the communications station units, wherein each of the communications station units is operable to wirelessly communicate with the base station unit, each of the communications station units is assigned to one of a plurality of groups that perform at least one of receiving and sending in a same communication time band, each of the groups having a different communication time band for downlink communication and uplink communication, the downlink communication and the uplink communication between the base station unit and the communications station units being performed with frames containing short data channels for sending short data and long data channels for sending long data and with time-division multiplexing regarding each of the groups, and, at a time of group assignment, regarding at least one of the downlink short data channels, the uplink short data channels, the downlink long data channels, and the uplink long data channels, a total number of data channels used by each of the groups is adjusted based on a number of data channels used by each of the communications station units, the base station unit comprises:

a data channel detection unit detect a number of short data channels used and a number of long data channels used by each of the communications station units regarding both the downlink communication and the uplink communication;

a group assignment unit, based on results detected by the data channel detection unit, adjust the number of short data channels used and the number of long data channels used by the groups and assign the communications station units to the groups; and a group assignment result notification unit provide information to the communications station units based on results of the group assignment by the group assignment unit, each of the communications station units comprises:

a group communication control unit, based on the information from the base station unit, perform the downlink communication and the uplink communication as a member of the group to which the communications station unit is assigned, the data channel detection unit to detect a number of times that short data is received on the short data channel and a number of times that long data is received on the long data channel from each of the communications station units during a group composition update time period as a usage situation of send channels, and detect a number of times that short data is sent on the short data channel and a number of times long data is sent on the long data channel to each of the communications station units during the group composition update time period as a usage situation of receive channels, the group assignment unit to take a value found by subtracting the number of times that the short data channel is received from the number of times that the short data channel is sent for each of the communications station units to be a short data channel send/receive state number of the respective communications station unit, take a value found by subtracting the number of times that the long data channel is received from the number of times that the long data channel is sent for each of the communications station units to be a long data channel send/receive state number of the respective communications station unit, arrange, as a first priority order, the communications station units in order from the communications station unit with a largest long data channel send/receive state number to the communications station unit with a smallest long data channel send/receive state number, arrange, as a second priority order, the communications station units with a same long data channel send/receive state number in order from the communications station unit with a largest short data channel send/receive state number to the communications station unit with a smallest short data channel send/receive state number, assign the communications station unit with a largest send/receive state number and the communications station unit with a smallest send/receive state number to the same group, and repeat, among the communications station units excluding the assigned communications station units, the assignment of the communications station unit with the largest send/receive state number and the communications station unit with the smallest send/receive state number to a same group that is different than any group having communications station units previously assigned thereto until all of the communications station units are assigned to the groups.

12. A wireless communications system comprising:

a plurality of communications station units; and a base station unit operable to wirelessly communicate with the communications station units, wherein each of the communications station units is operable to wirelessly communicate with the base station unit, each of the communications station units is assigned to one of a plurality of groups that perform at least one of receiving and sending in a same communication time band, each of the groups having a different communication time band for downlink communication and uplink communication, the downlink communication and the uplink communication between the base station unit and the communications station units being performed with frames containing short data channels for sending short data and long data channels for sending long data and with time-division multiplexing regarding each of the groups, and, at a time of group assignment, regarding at least one of the downlink short data channels, the uplink short data channels, the downlink long data channels, and the uplink long data channels, a total number of data channels used by each of the groups is adjusted based on a number of data channels used by each of the communications station units, the base station unit comprises:
- a data channel detection unit to detect a number of short data channels used and a number of long data channels used by each of the communications station units regarding at least one of the downlink communication and the uplink communication;
- a group assignment unit, based on results detected by the data channel detection unit, to adjust the number of short data channels used and the number of long data channels used by the groups and assign the communications station units to the groups; and
- a group assignment result notification unit to provide information to the communications station units based on results of the group assignment by the group assignment unit, each of the communications station units comprises:
- a group communication control unit, based on the information from the base station unit, to perform the downlink communication and the uplink communication as a member of the group to which the communications station unit is assigned, and each of the group communication control units, when the corresponding communications station unit receives the information from the base station unit on a broadcast control channel, is to take all frames used in wireless communication with the base station unit to be receive frames and receive broadcast control channels on all of the receive frames, search through the received broadcast control channels for a broadcast control channel corresponding to the group to which the corresponding communications station unit is assigned, determine send frames and receive frames used in the wireless communication for the group to which the corresponding communications station unit is assigned, and perform subsequent send and receive operations using the determined send frames and receive frames.

13. The wireless communications system according to claim 12, wherein the base station unit is operable to assign the communications station units to the groups so as to reduce empty communications time in the uplink communication and the downlink communication of the groups.

\* \* \* \* \*